US010863232B2

(12) United States Patent
Han et al.

(10) Patent No.: US 10,863,232 B2
(45) Date of Patent: Dec. 8, 2020

(54) DISPLAY DEVICE AND OPERATING METHOD THEREOF

(71) Applicant: LG ELECTRONICS INC., Seoul (KR)

(72) Inventors: Jungoo Han, Seoul (KR); Ubeom Heo, Seoul (KR); Yunseok Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/709,907

(22) Filed: Sep. 20, 2017

(65) Prior Publication Data
US 2018/0131993 A1    May 10, 2018

(30) Foreign Application Priority Data

Nov. 7, 2016    (KR) .................... 10-2016-0147234

(51) Int. Cl.
| | |
|---|---|
| H04N 21/485 | (2011.01) |
| H04N 21/436 | (2011.01) |
| H04N 21/422 | (2011.01) |
| H04N 21/41 | (2011.01) |
| H04N 21/6332 | (2011.01) |

(Continued)

(52) U.S. Cl.
CPC ... H04N 21/43615 (2013.01); H04N 21/4126 (2013.01); H04N 21/42218 (2013.01); H04N 21/42224 (2013.01); H04N 21/42228 (2013.01); H04N 21/485 (2013.01); H04N 21/6332 (2013.01); H04N 21/64322 (2013.01)

(58) Field of Classification Search
None
See application file for complete search history.

(56) References Cited

U.S. PATENT DOCUMENTS

| | | | |
|---|---|---|---|
| 6,211,870 B1 * | 4/2001 | Foster | |
| 6,593,941 B1 * | 7/2003 | Sameshima | ........... G06F 3/0482 348/E5.102 |
| 8,098,140 B1 * | 1/2012 | Escobosa | |

(Continued)

FOREIGN PATENT DOCUMENTS

| | | |
|---|---|---|
| CN | 101817331 A | 9/2010 |
| CN | 103287332 A | 9/2010 |

(Continued)

*Primary Examiner* — Andre L Matthews
(74) *Attorney, Agent, or Firm* — Birch, Stewart, Kolasch & Birch, LLP

(57) ABSTRACT

A display device including a display configured to display a received broadcast; a user input interface configured to receive a signal from a remote control device; and a controller configured to: when a function key setup mode entry signal is received from the remote control device, display a plurality of keys of the remote control device on the display, the plurality of keys respectively including images of numeric keys for inputting a desired number, display a mapped application icon on the image of a key to which an application is mapped among the plurality of keys, in response to a first preset input on the image of the key to which the application is mapped, input the desired number, and in response to a second preset input on the image of the key to which the application is mapped, stop the broadcast and execute the application.

14 Claims, 30 Drawing Sheets

(51) Int. Cl.
*H04N 21/643* (2011.01)
*H04N 21/63* (2011.01)

(56) References Cited

U.S. PATENT DOCUMENTS

| | | | |
|---|---|---|---|
| 8,953,099 B2 | 2/2015 | Kwak | |
| 9,432,608 B2 | 8/2016 | Kim et al. | |
| 2006/0181429 A1 | 8/2006 | Garrison | |
| 2012/0089895 A1* | 4/2012 | Ishii | H04M 1/72583 |
| | | | 715/205 |
| 2013/0003993 A1 | 1/2013 | Michalski et al. | |
| 2013/0242192 A1 | 9/2013 | Chen et al. | |
| 2013/0258207 A1* | 10/2013 | Kim | G08C 17/02 |
| | | | 348/734 |
| 2013/0300944 A1* | 11/2013 | Lee | H04N 21/42228 |
| | | | 348/734 |
| 2015/0160826 A1* | 6/2015 | Narita | G06F 3/04817 |
| | | | 715/765 |
| 2015/0172777 A1 | 6/2015 | Park et al. | |
| 2015/0220223 A1 | 8/2015 | Michalski et al. | |

FOREIGN PATENT DOCUMENTS

| | | |
|---|---|---|
| CN | 103158647 A | 6/2013 |
| CN | 103369389 A | 10/2013 |
| CN | 103873908 A | 6/2014 |
| CN | 104202642 A | 12/2014 |
| EP | 2890145 A1 | 7/2015 |
| JP | 2009-163735 A | 7/2009 |
| KR | 10-2009-0071949 A | 7/2009 |
| KR | 10-2009-0078457 A | 7/2009 |
| KR | 10-2013-0126067 A | 11/2013 |
| KR | 10-2015-0081140 A | 7/2015 |

\* cited by examiner

DISPLAY DEVICE AND OPERATING METHOD THEREOF

CROSS-REFERENCE TO RELATED APPLICATIONS

This application claims priority under 35 U.S.C. §§ 119 and 365 to Korean Patent Application No. 10-2016-0147234, filed in the Korean Intellectual Property Office on Nov. 7, 2016, the disclosure of which is incorporated herein by reference.

BACKGROUND OF THE INVENTION

Field of the Invention

The present invention relates to a display device and an operating method thereof.

Discussion of the Background

Digital display device services using a wired or wireless communication network have become common. The digital display device service can provide various services that could not be provided in an existing analog broadcast service. For example, an Internet Protocol (IP) display device (IP Television) or a smart display device service, which is a type of a digital display device service, provides a bi-directional service that allows a user to actively select a type of a program to be watched, a watching time, and the like. The IP display device service or the smart display device service may provide various additional services based on the bi-directionality, for example, Internet browsing, home shopping, online games, and the like.

Recently, as digital broadcast using a cable or a satellite has been launched, the number of channels increases from several tens to over several hundreds. Thus, a user can select and view desired information, as well as receiving only information unilaterally transmitted by a broadcasting company.

A known remote control device for a display device has a matrix structure and includes a key input unit configured to output a key signal, a transmission unit configured to receive the key signal output by the key input unit, confirm a type of an input key, and output a predetermined frequency according to the input key, and an infrared light-emitting element configured to receive the predetermined frequency output by the transmission unit and output an infrared signal to the display device.

As for the operation of the remote control device for the display device, which has the above-described structure, when the user presses a desired channel number, the key input unit outputs a key signal corresponding to the channel number, the transmission unit receives the key signal output by the key input unit, confirms the input channel number, and outputs a frequency signal corresponding to the channel number, and the infrared light-emitting element receives the frequency signal output by the transmission unit and outputs a predetermined infrared signal.

SUMMARY OF THE INVENTION

Embodiments of the present disclosure provide a channel change method using shortcut keys, which can rapidly and easily change a channel by using a mode change button capable of switching a numeric key of a remote control device to a specific shortcut key.

Embodiments of the present disclosure allow a user to easily select a frequently used function by setting a shortcut key without adding a button to a remote control device.

Embodiments of the present disclosure add a separate programmable shortcut function key to a remote control device so that a menu frequently used by a user is used through the shortcut function key.

In one embodiment, a display device includes: a display unit; a user input interface configured to receive a signal from a remote control device; and a control unit configured to control an operation of the display device, wherein, when a function key setup mode entry signal is received, the control unit performs control to display images of a plurality of keys of the remote control device, and a mapped application icon is displayed on an image of a key to which an application is mapped among the plurality of keys.

In another embodiment, a method of controlling a display device includes: receiving a function key setup mode entry signal; and displaying images of a plurality of keys of a remote control device connected to the display device, wherein a mapped application icon is displayed on an image of a key to which an application is mapped among the plurality of keys.

The details of one or more embodiments are set forth in the accompanying drawings and the description below. Other features will be apparent from the description and drawings, and from the claims.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Figure 1:
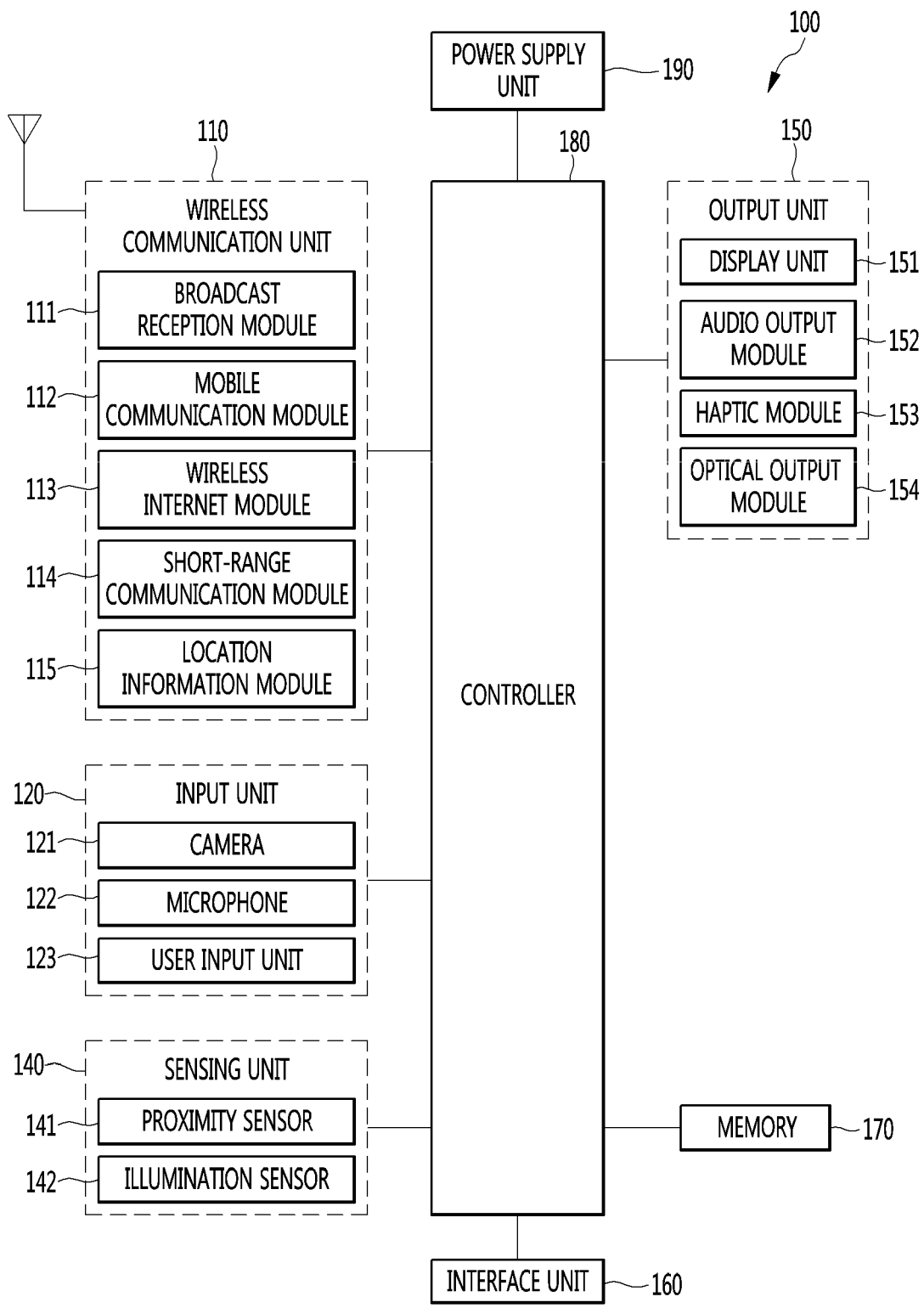
FIG. 1 is a block diagram of a mobile terminal according to an embodiment of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Like reference numerals refer to like elements throughout.

The suffix "module" and "unit" for components, which are used in the description below, are assigned and mixed in consideration of only the easiness in writing the specification. That is, the suffix itself does not have different meanings or roles. While terms such as "first" and "second" may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

In the specification, when an element is referred to as being "connected" or "coupled" to another element, it can be directly connected or coupled to the another element or be indirectly connected or coupled to the another element with one or more intervening elements interposed therebetween. Singular forms in the present disclosure are intended to include the plural forms as well, unless the context clearly indicates otherwise.

It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

A display device according to an embodiment, for example, as an intelligent display device having both of the broadcast reception function and the computer assisted function, may include more convenient user-friendly interface than a handwriting input device, a touch screen or space remote controller, and the like, by adding an Internet function while fulfilling a broadcasting receiving function. In addition, the display device may also perform on E-mail, a web browsing, Internet banking or games, and the like by connecting to an Internet and computer supporting a wired or wireless internet function. In order to perform various functions described above, a general purpose operation system (OS) may be used.

Therefore, in the display device described in the present disclosure, since various applications may be freely added or deleted on a general OS Kernel, various user-friendly functions may be performed. More specifically, the display device may be, for example, a network TV, a HBBTV, a smart TV, an LED TV, an OLED TV, and the like, and may be applied in a smart phone in some cases.

Mobile terminals described in this specification may include a mobile phone, a smart phone, a laptop computer, a terminal for digital broadcast, a personal digital assistant (PDA), a portable multimedia player (PMP), a navigator, a slate PC, a tablet PC, an ultrabook, a wearable device (e.g., a watch type terminal (smart watch), a glass type terminal (smart glass), a head mounted display (HMD)), and the like.

However, it will be readily understood by those skilled in the art that the configuration according to the embodiments of this specification can also be applied to stationary terminals such as a digital TV, a desktop computer, and a digital signage, excluding a case of being applicable only to the mobile terminals.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the mobile terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1 is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Figure 2:
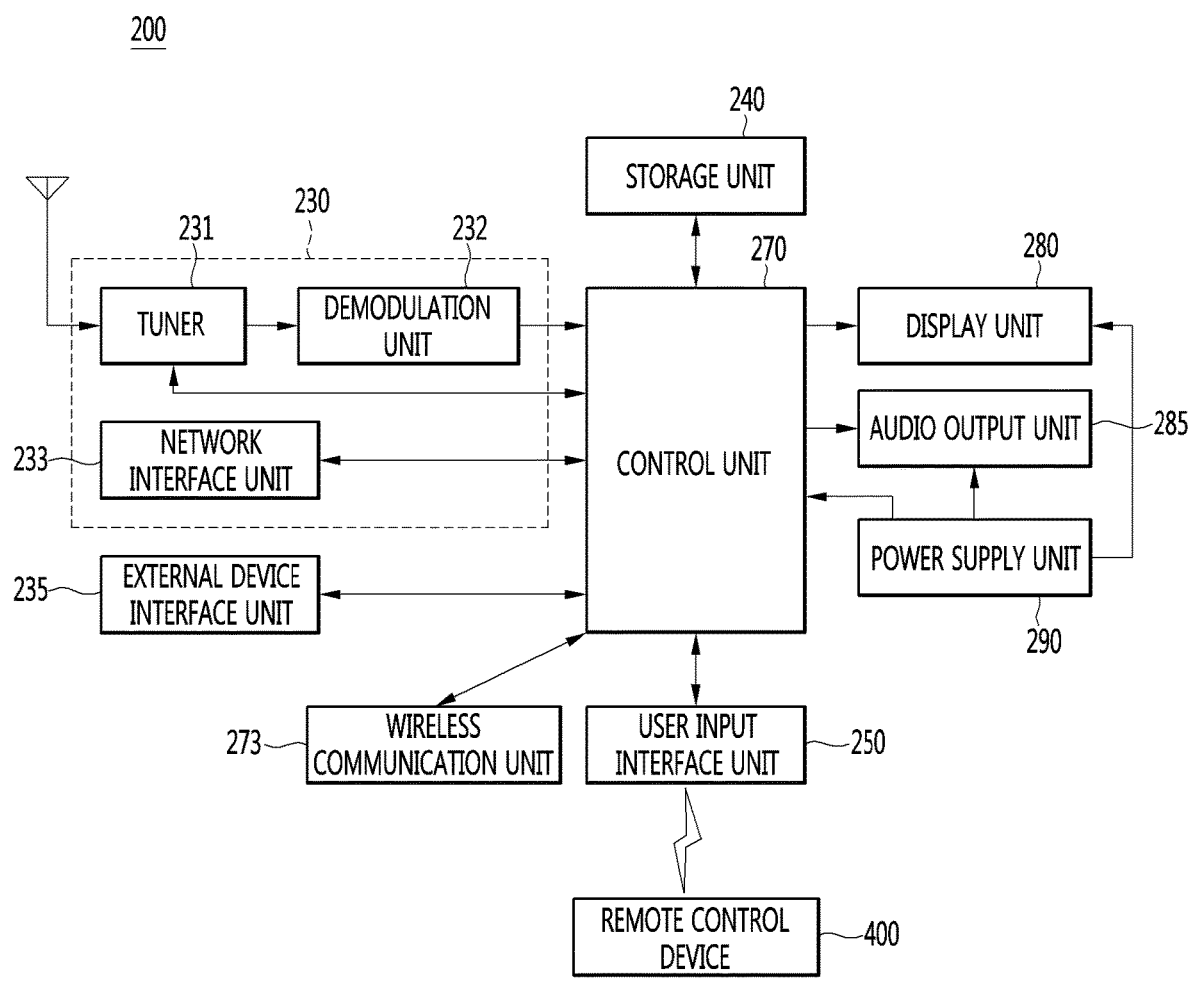
FIG. 2 is a block diagram illustrating a configuration of a display device according to an embodiment of the present disclosure.

FIG. 2 is a block diagram illustrating a configuration of a display device according to an embodiment. Referring to FIG. 2, a display device 200 can include a broadcast reception unit 230, an external device interface unit 235, a storage unit 240, a user input interface unit 250, a control unit 270, a wireless communication unit 273, a display unit 280, an audio output unit 285, and a power supply unit 290.

The broadcast reception unit 230 can include a tuner 231, a demodulation unit 232, and a network interface unit 233. The tuner 231 can select a specific broadcast channel according to a channel selection command. The tuner 231 can receive broadcast signals for the selected specific broadcast channel. The demodulation unit 232 can divide the received broadcast signals into video signals, audio signals, and broadcast program related data signals and restore the divided video signals, audio signals, and data signals to an output available form.

The external device interface unit 235 can receive an application or an application list in an adjacent external device and deliver it to the control unit 270 or the storage unit 240. The external device interface 235 can provide a connection path between the display device 200 and an external device. The external device interface 235 can receive at least one of image and audio output from an external device that is wirelessly or wiredly connected to the display device 200 and deliver it to the control unit. The external device interface unit 235 can include a plurality of external input terminals. The plurality of external input terminals can include an RGB terminal, at least one High Definition Multimedia Interface (HDMI) terminal, and a component terminal.

An image signal of an external device input through the external device interface unit 235 can be output through the display unit 280. A sound signal of an external device input through the external device interface unit 235 can be output through the audio output unit 285. An external device connectable to the external device interface unit 235 can be one of a set-top box, a Blu-ray player, a DVD player, a game console, a sound bar, a smartphone, a PC, a USB Memory, and a home theater system but this is just exemplary.

The network interface unit 233 can provide an interface for connecting the display device 200 to a wired/wireless network including internet network. The network interface unit 233 can transmit or receive data to or from another user or another electronic device through an accessed network or another network linked to the accessed network. Additionally, some content data stored in the display device 200 can be transmitted to a user or an electronic device, which is selected from other users or other electronic devices pre-registered in the display device 200.

The network interface unit 233 can access a predetermined webpage through an accessed network or another network linked to the accessed network. That is, it can transmit or receive data to or from a corresponding server by accessing a predetermined webpage through network. Then, the network interface unit 233 can receive contents or data provided from a content provider or a network operator. That is, the network interface unit 233 can receive contents such as movies, advertisements, games, VODs, and broadcast signals, which are provided from a content provider or a network provider, through network and information relating thereto.

Additionally, the network interface unit 233 can receive firmware update information and update files provided from a network operator and transmit data to an internet or content provider or a network operator. The network interface unit 233 can select and receive a desired application among applications open to the air, through network.

The storage unit 240 can store signal-processed image, voice, or data signals stored by a program in order for each signal processing and control in the control unit 270. Additionally, the storage unit 240 can perform a function for temporarily store image, voice, or data signals output from the external device interface unit 235 or the network interface unit 233 and can store information on a predetermined image through a channel memory function. The storage unit 240 can store an application or an application list input from the external device interface unit 135 or the network interface unit 233.

The display device 200 can play content files (for example, video files, still image files, music files, document files, application files, and so on) stored in the storage unit 240 and provide them to a user. The user input interface unit 250 can deliver signals input from a user to the control unit 270 or deliver signals from the control unit 270 to a user. For example, the user input interface unit 250 can receive or process control signals such as power on/off, channel selection, and screen setting from the remote control device 400 or transmit control signals from the control unit 270 to the remote control device 400 according to various communication methods such as Bluetooth, Ultra Wideband (WB), ZigBee, Radio Frequency (RF), and IR.

Additionally, the user input interface unit 250 can deliver, to the control unit 270, control signals input from local keys such as a power key, a channel key, a volume key, and a setting key. Image signals that are image-processed in the control unit 270 can be input to the display unit 280 and displayed as an image corresponding to corresponding image signals. Additionally, image signals that are image-processed in the control unit 270 can be input to an external output device through the external device interface unit 235.

Voice signals processed in the control unit 270 can be output to the audio output unit 285. Additionally, voice signals processed in the control unit 270 can be input to an external output device through the external device interface unit 235. Besides that, the control unit 270 can control overall operations in the display device 200.

Additionally, the control unit 270 can control the display device 200 by a user command or internal program input through the user input interface unit 250 and download a desired application or application list into the display device 200 in access to network. The control unit 270 can output channel information selected by a user together with processed image or voice signals through the display unit 280 or the audio output unit 285.

Additionally, according to an external device image playback command received through the user input interface unit 250, the control unit 270 can output image signals or voice signals of an external device such as a camera or a camcorder, which are input through the external device interface unit 235, through the display unit 280 or the audio output unit 285.

Moreover, the control unit 270 can control the display unit 280 to display images and control broadcast images input through the tuner 231, external input images input through the external device interface unit 235, images input through the network interface unit, or images stored in the storage unit 240 to be displayed on the display unit 280. In this instance, an image displayed on the display unit 280 can be a still image or video and also can be a 2D image or a 3D image.

The control unit 270 can play content stored in the display device 200, received broadcast content, and external input content input from the outside, and the content can be in various formats such as broadcast images, external input images, audio files, still images, accessed web screens, and document files.

Moreover, the wireless communication unit 273 can perform a wired or wireless communication with an external electronic device. The wireless communication unit 273 can perform short-range communication with an external device. For this, the wireless communication unit 273 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 273 can support wireless communication between the display device 200 and a wireless communication system, between the display device 200 and another display device 200, or between networks including the display device 200 and another display device 200 (or an external server) through wireless area networks. The wireless area networks can be wireless personal area networks.

Herein, the other display device 200 can be a mobile terminal such as a wearable device (for example, a smart watch, a smart glass, and a head mounted display (HMD)) or a smartphone, which is capable of exchanging data (or inter-working) with the display device 200. The wireless communication unit 273 can detect (or recognize) a communicable wearable device around the display device 200. Furthermore, if the detected wearable device is a device authenticated to communicate with the display device 200, the control unit 270 can transmit at least part of data processed in the display device 200 to the wearable device through the wireless communication unit 273. Accordingly, a user of the wearable device can use the data processed in the display device 200 through the wearable device. The wireless communication unit 273 can be provided separated from the external device interface unit 235 and can be included in the external device interface unit 235.

The display unit 280 can convert image signals, data signals, or OSD signals, which are processed in the control unit 270, or images signals or data signals, which are received in the external device interface unit 235, into R, G, and B signals to generate driving signals. Furthermore, the display device 200 shown in FIG. 2 is just one embodiment and thus, some of the components shown can be integrated, added, or omitted according to the specification of the actually implemented display device 200.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment, unlike FIG. 2, the display device 200 can receive images through the network interface unit 233 or the external device interface unit 235 and play them without including the tuner 231 and the demodulation unit 232. For example, the display device 200 can be divided into an image processing device such as a set-top box for receiving broadcast signals or contents according to various network services and a content playback device for playing contents input from the image processing device.

In this instance, an operating method of a display device according to an embodiment described below can be performed by one of the display device described with reference to FIG. 2, an image processing device such as the separated set-top box, and a content playback device including the display unit 280 and the audio output unit 285.

Figure 3:
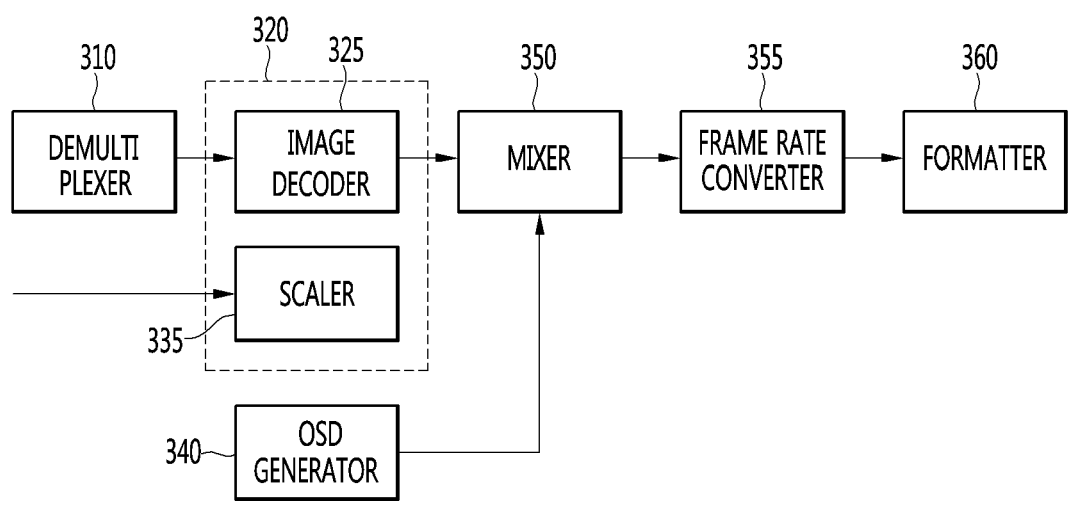
FIG. 3 is a block diagram illustrating a detailed configuration of a control unit of FIG. 2 according to an embodiment of the present disclosure.

FIG. 3 is a block diagram illustrating a detailed configuration of a control unit of FIG. 2 according to an embodiment. An example of the control unit 270 may include a demultiplexer 310, an image processor 320, an OSD generator 340, a mixer 350, a frame rate converter 355, and a formatter 360. In addition, the control unit may further include a voice processor and a data processor.

The demultiplexer 310 demultiplexes a stream signal input thereto. For example, the demultiplexer 310 may demultiplex the input stream signal into MPEG-2 TS, voice, and data signals. Here, the stream signal input to the demultiplexer 310 may be a stream signal output from a tuner, a demodulator, or an external device interface unit.

The image processor performs image processing of a multiplexed image signal. Thus, the image processor 320 may include an image decoder 325 and a scaler 335. The image decoder 325 decodes a demultiplexed image signal, and the scaler 335 scales a resolution of the decoded image signal to be capable of being output on the display unit.

The image decoder 325 may support various standards. For example, when an image signal is encoded in an MPEG-2 standard, the image decoder 325 may perform a function of an MPEG-2 decoder. When an image signal is encoded in a digital multimedia broadcasting (DMB) scheme or H.264 standard, the image decoder 325 may perform a function of an H.264 decoder. In addition, the image signal decoded by the image processor 320 is input to the mixer 350.

The OSD generator 340 generates OSD data based on a user input or autonomously. For example, the OSD generator 340 generates data for displaying various types of data in a graphic or text form on a screen of the display unit 280, based on a control signal of the user input interface unit. The generated OSD data includes various data including user interface screens, various menu screens, widgets, icons, viewing rate information, and the like of a digital device. The OSD generator 340 may generate data for displaying broadcast information based on subtitles or EPG of a broadcast image.

The mixer 350 mixes the OSD data generated by the OSD generator 340 and the image signal image-processed by the image processor 320 and provides them to the formatter 360. As the decoded image signal and the OSD data are mixed, OSD is displayed to be overlaid on a broadcast image or external input image.

The FRC 355 converts a frame rate of an image input thereto. For example, the FRC 355 may convert a frame rate of a 60 Hz image into a frame rate of 120 Hz or 240 Hz according to the output frequency of the display unit. As described above, a method for converting a frame rate may vary. As an example, when a frame rate is converted from 60 Hz to 120 Hz, the FRC 355 may convert the frame rate by inserting a first frame between the first frame and a second frame or inserting a third frame predicted from the first frame and the second frame. As another example, when a frame rate is converted from 60 Hz to 240 Hz, the FRC 355 may convert the frame rate by further inserting three same frames or three predicted frames. In addition, when a separate frame conversion is not performed, the FRC 355 may be bypassed.

The formatter 360 changes an output of the FRC 355 to be suitable for an output format of the display unit. For example, the formatter 360 may output an R, G, and B data signal. The R, G, and B data signal may be output as a low voltage differential signal (LVDS) or mini-LVDS. When the output of the FRC 355 is a 3D image signal, the formatter 360 may change and output the output of the FRC 355 in a 3D form to be suitable for the output format of the display unit, so that a 3D service can be supported through the display unit.

In addition, the voice processor in the control unit may perform voice processing of a demultiplexed voice signal. The voice processor may be supported to process various audio formats. As an example, even when a voice signal is encoded in a format such as MPEG-2, MPEG-4, AAC, HE-AAC, AC-3, or BSAC, the voice signal may be processed by providing a decoder corresponding to the format. In addition, the voice processor in the control unit may process a base, a treble, volume control, and the like.

The data processor in the control unit may perform data processing of a demultiplexed data signal. For example, even when the demultiplexed data signal is encoded, the data processor may decode the encoded data signal. Here, the encoded data signal may be EPG information including broadcast information on a start time, an end time, and the like of a broadcast program broadcasted in each channel.

In addition, the above-described digital device is an exemplary embodiment according to the present disclosure, and each component of the digital device may be integrated, added, or omitted according to specifications of an actually implemented digital device. That is, if necessary, two or more components may be integrated as one component, or one component may be segmented into two or more components. In addition, a function performed in each block is for the purpose of describing embodiments of the present disclosure, and its detailed operation or device does not limit the scope of the present disclosure.

In addition, the digital device may be an image signal processing device that performs signal processing of an image stored in the device or an image input to the device. Other examples of the image signal processing device may further include a set-top box (STB), a DVD player, a blue-ray player, a game device, a computer, and the like, except the display unit 280 and the audio output unit 285, shown in FIG. 2.

According an embodiment, the display device 200 operating as a sink device may include a voice signal receiving unit. The voice signal receiving unit of the display device 200 receives a voice signal. The voice signal receiving unit may include a microphone to directly receive an external voice signal and convert the received voice signal into an electrical voice signal. The voice signal receiving unit may receive an electrical voice signal from an external device. In the latter, the voice signal receiving unit may be implemented as at least one of the network interface unit 233, the external device interface unit 235, and the user input interface unit 250.

Further, according to an embodiment, the storage unit 240 may store a text conversion algorithm that converts a received voice signal into a text. The control unit 270 may convert the received voice signal into a text using the text conversion algorithm stored in the storage unit 240. In addition, according to an embodiment, the storage unit 240 may store an algorithm for recognizing texts displayed on a screen of the display unit 280 and recognizing objects in an image.

Figure 4:
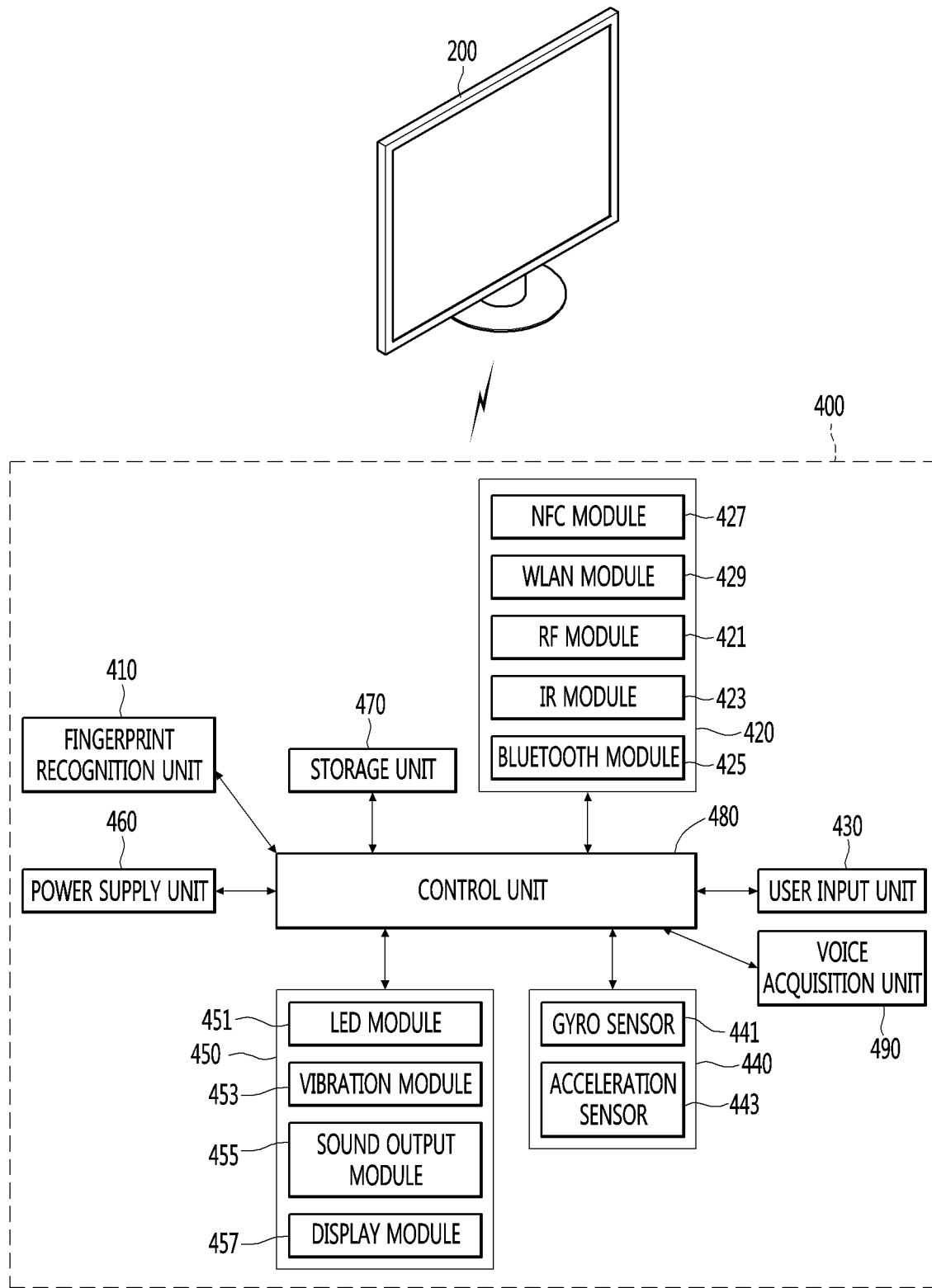
FIG. 4 is a block diagram illustrating a remote control device according to an embodiment of the present disclosure.
Figure 5:
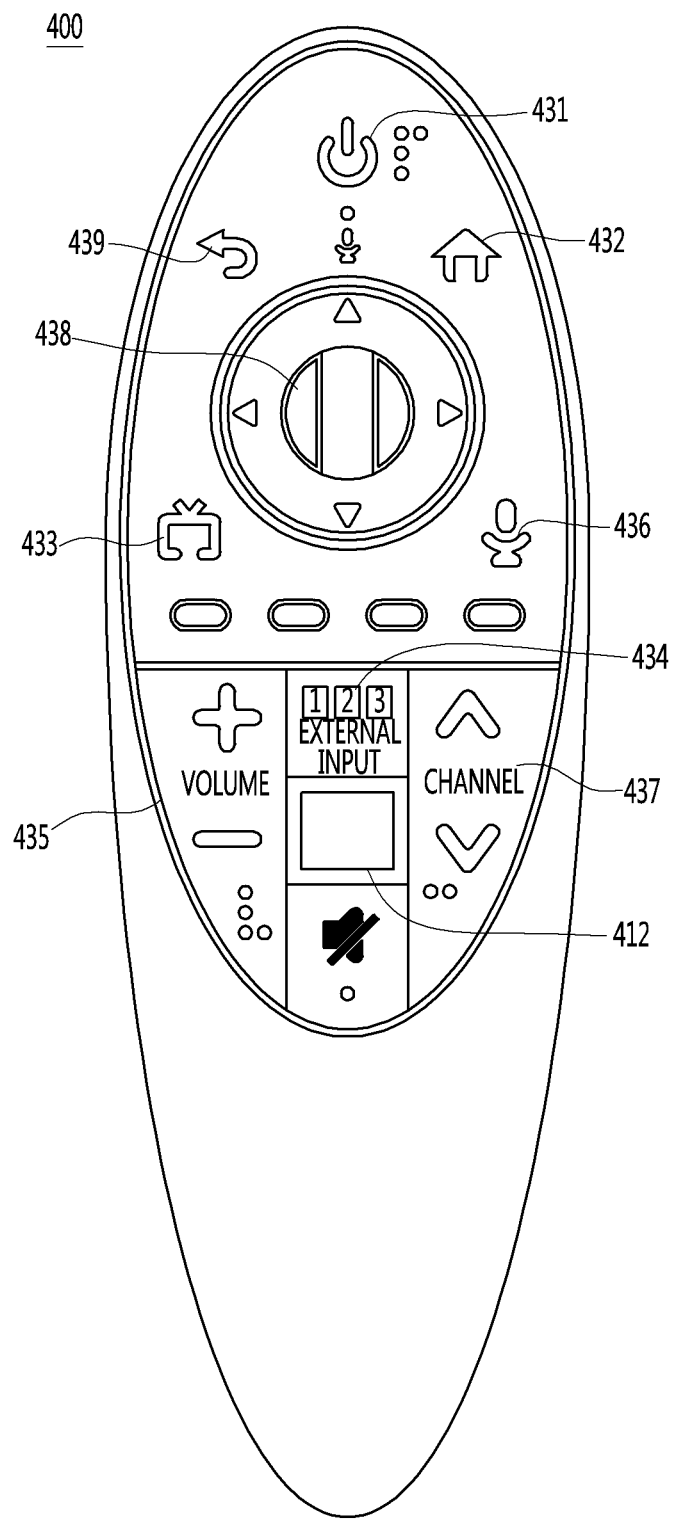
FIG. 5 is a view illustrating a configuration of a remote control device according to an embodiment of the present disclosure.

Then, referring to FIGS. 4 and 5, a remote control device is described according to an embodiment. In particular, FIG. 4 is a block diagram illustrating a remote control device according to an embodiment and FIG. 5 is a view illustrating an actual configuration of a remote control device according to an embodiment.

First, referring to FIG. 4, a remote control device 400 can include a fingerprint recognition unit 410, a wireless communication unit 420, a user input unit 430, a sensor unit 440, an output unit 450, a power supply unit 460, a storage unit 470, a control unit 480, and a voice acquisition unit 490.

Referring to FIG. 4, the wireless communication unit 420 transmits/receives signals to/from an arbitrary any one of display devices according to the above-mentioned embodiments. The remote control device 400 can include an RF module 421 for transmitting/receiving signals to/from the display device 200 according to the RF communication standards and an IR module 423 for transmitting/receiving signals to/from the display device 200 according to the IR communication standards. Additionally, the remote control device 400 can include a Bluetooth module 425 for transmitting/receiving signals to/from the display device 200 according to the Bluetooth communication standards. Additionally, the remote control device 400 can include an NFC module 427 for transmitting/receiving signals to/from the display device 200 according to the Near Field Communication (NFC) communication standards and a WLAN module 429 for transmitting/receiving signals to/from the display device 200 according to the Wireless LAN (WLAN) communication standards.

Additionally, the remote control device 400 can transmit signals containing information on a movement of the remote control device 400 to the display device 200 through the wireless communication unit 420. Moreover, the remote control device 400 can receive signals transmitted from the display device 200 through the RF module 421 and if necessary, can transmit a command on power on/off, channel change, and volume change to the display device 200 through the IR module 423.

The user input unit 430 can be configured with a keypad button, a touch pad, or a touch screen. A user can manipulate the user input unit 430 to input a command relating to the display device 200 to the remote control device 400. If the user input unit 430 includes a hard key button, a user can input a command relating to the display device 200 to the remote control device 400 through the push operation of the hard key button. This will be described with reference to FIG. 5.

Referring to FIG. 5, the remote control device 400 can include a plurality of buttons. The plurality of buttons can include a fingerprint recognition button 412, a power button 431, a home button 432, a live button 433, an external input button 434, a voice adjustment button 435, a voice recognition button 436, a channel change button 437, a check button 438, and a back button 439.

The fingerprint recognition button 412 can be a button for recognizing a user's fingerprint. According to an embodiment, the fingerprint recognition button 412 can perform a push operation and receive a push operation and a fingerprint recognition operation. The power button 431 can be button for turning on/off the power of the display device 200. The power button 431 can be button for moving to the home screen of the display device 200. The live button 433 can be a button for displaying live broadcast programs. The external input button 434 can be button for receiving an external input connected to the display device 200. The voice adjustment button 435 can be button for adjusting the size of a volume output from the display device 200. The voice recognition button 436 can be a button for receiving user's voice and recognizing the received voice. The channel change button 437 can be a button for receiving broadcast signals of a specific broadcast channel. The check button 438 can be a button for selecting a specific function and the back button 439 can be a button for returning to a previous screen.

Again, FIG. 4 is described. If the user input unit 430 includes a touch screen, a user can touch a soft key of the touch screen to input a command relating to the display device 200 to the remote control device 400. Additionally, the user input unit 430 can include various kinds of input means manipulated by a user, for example, a scroll key and a jog key, and this embodiment does not limit the scope of the present disclosure.

The sensor unit 440 can include a gyro sensor 441 or an acceleration sensor 443 and the gyro sensor 441 can sense information on a movement of the remote control device 400. For example, the gyro sensor 441 can sense information on an operation of the remote control device 400 based on x, y, and z axes and the acceleration sensor 443 can sense information on a movement speed of the remote control device 400. Moreover, the remote control device 400 can further include a distance measurement sensor and sense a distance with respect to the display unit 280 of the display device 200.

The output unit 450 can output image or voice signals corresponding to a manipulation of the user input unit 430 or corresponding to signals transmitted from the display device 200. A user can recognize whether the user input unit 430 is manipulated or the display device 200 is controlled through the output unit 450.

For example, the output unit 450 can include an LED module 451 for flashing, a vibration module 453 for generating vibration, a sound output module 455 for outputting sound, or a display module 457 for outputting an image, if the user input unit 430 is manipulated or signals are transmitted/received to/from the display device 200 through the wireless communication unit 420.

Additionally, the power supply unit 460 supplies power to the remote control device 400 and if the remote control device 400 does not move for a predetermined time, stops the power supply, so that power waste can be reduced. The power supply unit 460 can resume the power supply if a predetermined key provided at the remote control device 400 is manipulated.

The storage unit 470 can store various kinds of programs and application data necessary for a control or operation of the remote control device 400. If the remote control device 400 transmits/receives signals wirelessly through the display device 200 and the RF module 421, the remote control device 400 and the display device 200 transmits/receives signals through a predetermined frequency band.

The control unit 480 of the remote control device 400 can store, in the storage unit 470, information on a frequency band for transmitting/receiving signals to/from the display device 200 paired with the remote control device 400 and refer to it. The control unit 480 controls general matters relating to a control of the remote control device 400. The control unit 480 can transmit a signal corresponding to a predetermined key manipulation of the user input unit 430 or a signal corresponding to a movement of the remote control device 400 sensed by the sensor unit 440 to the display device 200 through the wireless communication unit 420.

Additionally, the voice acquisition unit 490 of the remote control device 400 can obtain voice. The voice acquisition unit 490 can include at least one microphone 491 and obtain voice through the microphone 491.

Figure 6:
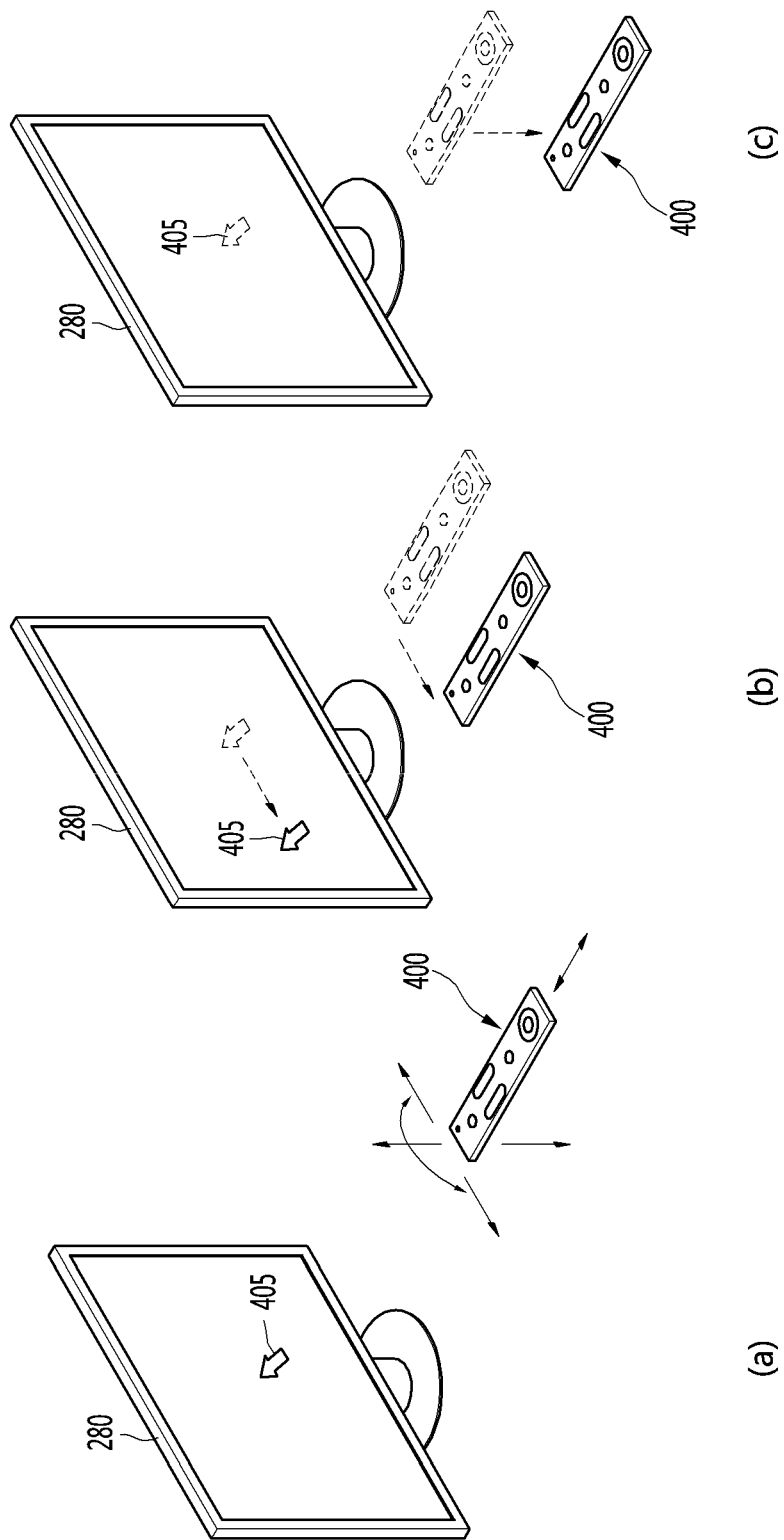
FIG. 6 is a view of utilizing a remote control device according to an embodiment of the present disclosure.

Next, FIG. 6 is a view of utilizing a remote control device according to an embodiment. In particular, FIG. 6(a) illustrates that a pointer 405 corresponding to the remote control device 400 is displayed on the display unit 280. A user can move or rotate the remote control device 400 vertically or horizontally. The pointer 405 displayed on the display unit 280 of the display device 200 corresponds to a movement of the remote control device 400. Since the corresponding pointer 405 is moved and displayed according to a movement on a 3D space as show in the drawing, the remote control device 400 can be referred to as a spatial remote controller.

FIG. 6(b) illustrates that if a user moves the remote control device 400, the pointer 405 displayed on the display unit 280 of the display device 200 is moved to the left in correspondence thereto. Information on a movement of the remote control device 400 detected through a sensor of the remote control device 400 is transmitted to the display device 200. The display device 200 can calculate the coordinates of the pointer 405 from the information on the movement of the remote control device 400. The display device 200 can display the pointer 405 to match the calculated coordinates.

FIG. 6(c) illustrates that while a specific button in the remote control device 400 is pressed, a user moves the remote control device 400 away from the display unit 280. Thus, a selection area in the display unit 280 corresponding to the pointer 405 can be zoomed in and displayed largely. Further, if a user moves the remote control device 400 close to the display unit 280, a selection area in the display unit 280 corresponding to the pointer 405 can be zoomed out and displayed reduced.

If the remote control device 400 is away from the display unit 280, a selection area can be zoomed out and if the remote control device 400 is close to the display unit 280, a selection area can be zoomed in. Additionally, if a specific button in the remote control device 400 is pressed, the recognition of a vertical or horizontal movement can be excluded. That is, if the remote control device 400 is moved away from or close to the display unit 280, the up, down, left, or right movement cannot be recognized and only the back and fourth movement can be recognized. While a specific button in the remote control device 400 is not pressed, only the pointer 405 is moved according to the up, down, left or right movement of the remote control device 400.

Moreover, the moving speed or moving direction of the pointer 405 can correspond to the moving speed or moving direction of the remote control device 400. Furthermore, a pointer in this specification means an object displayed on the display unit 280 in correspondence to an operation of the remote control device 400. Accordingly, besides an arrow form displayed as the pointer 405 in the drawing, various forms of objects are possible. For example, the above concept includes a point, a cursor, a prompt, and a thick outline. Then, the pointer 405 can be displayed in correspondence to one point of a horizontal axis and a vertical axis on the display unit 280 and also can be displayed in correspondence to a plurality of points such as a line and a surface.

Figure 7:
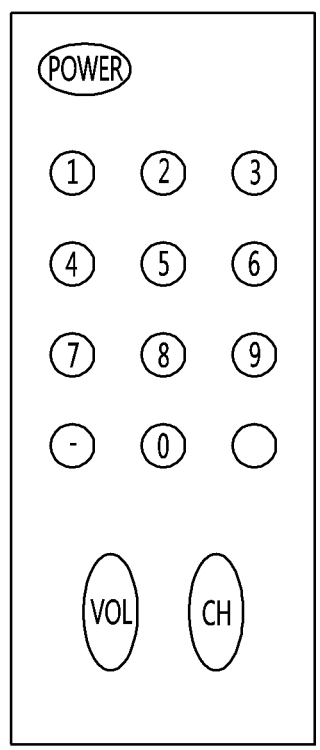
FIGS. 7 and 8 are views illustrating a channel change method using a shortcut key in a remote control device.

Next, FIGS. 7 to 10 are views illustrating a channel change method using a shortcut key in a remote control device. In particular, FIG. 7 illustrates a configuration of a general remote control device. In the remote control device commonly used in a display device, a method using numeric keys of a key input unit and a method using channel up/down keys are used as a method of selecting a channel stored in a display device TV receiver. A channel change method using the numeric keys is used when a user knows a channel number of a channel that the user wants to watch, and the user can change a channel by directly pressing a channel number. A channel change method using the channel up/down keys is used when the user does not know a channel number of a channel that the user wants to watch, and the user can find and watch a desired channel by a channel change using the channel up/down keys.

The channel change method using the shortcut key in accordance with the present disclosure is a channel change method using a remote control device for a display device, including: selecting a channel in a number input mode and changing a mode to a shortcut key mode by using a mode change button; setting a shortcut key, which is marked with a specific name desired by a user, to the channel in the shortcut key mode; and changing to a channel desired by the user by using the set shortcut key.

Also, by using an openable numeric keypad and a shortcut keypad disposed at the same position as the numeric key under the numeric keypad, the mode change button may be automatically turned on or off according to the opening or closing of the numeric keypad to change the mode to the number input mode and the shortcut key mode.

In addition, the mode change button may be disposed above the remote control device and turned on and off to change the mode to the number input mode and the shortcut key mode. The channel change method using the shortcut key according to embodiments of the present disclosure, which has the above-described characteristics, will be described in detail with reference to the accompanying drawings.

Figure 8:
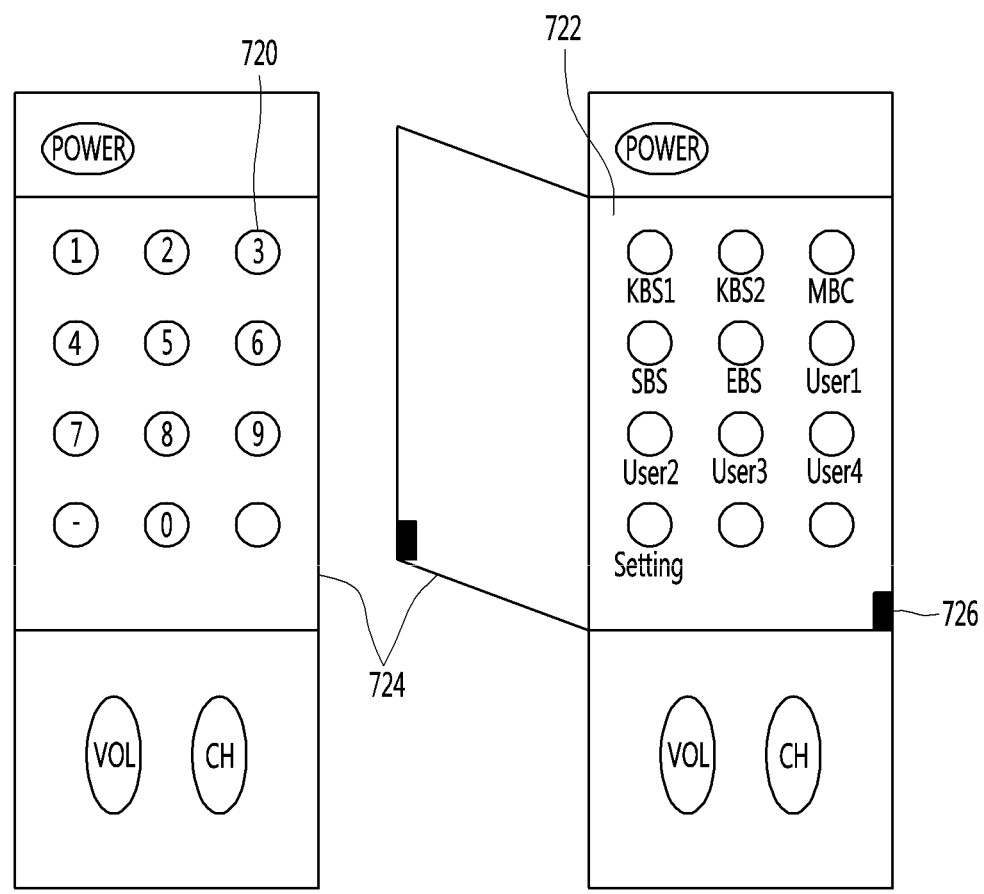

FIG. 8 is a view illustrating a configuration of a remote control device for performing a channel change method using a shortcut key in a display device according to an embodiment of the present invention. As shown in FIG. 8, the remote control device includes a numeric keypad 720 configured to be openable and select a channel by inputting a number; a mode change button 726 configured to change a mode by a front cover 724; and a shortcut keypad 722 disposed at the same position as the numeric keypad 720 under the front cover 724 and used as a shortcut key by the mode change button 726. For user convenience, shortcut keys of the shortcut keypad 722 are respectively marked with specific names, and a setup key is provided for allowing a user to set a shortcut key to a desired channel.

The operations of the remote control device will be separately described in two modes. The remote control device has a number input mode when the front cover 724 is closed, that is, when the mode change button 726 is in an on (or off) state, and a shortcut mode when the front cover 724 is opened, that is, when the mode change button 726 is in an off (or on) state.

In the number input mode when the front cover 724 is closed, the remote control device performs the same operation as that of a general remote control device. That is, when the user knows a channel number of a desired channel, the user can change a channel by directly pressing the channel number. When the user does not know a channel number of a desired channel, the user can find and watch the desired channel by a channel change using channel up/down keys.

In the shortcut key mode when the front cover 724 is opened, when the user wants to set a shortcut key to a channel that the user is currently watching, the user designates a shortcut key to the channel by pressing a setup button on the shortcut keypad 722 and then pressing a shortcut key that the user desires. When the user wants to change the channel by using the designated shortcut key while watching another channel in the number input mode, the user can open the front cover 724 to change a mode to the shortcut key mode, changes the channel by pressing a shortcut key, in which a channel number of a channel that the user wants to watch is stored, and then, watch the channel.

Figure 9:
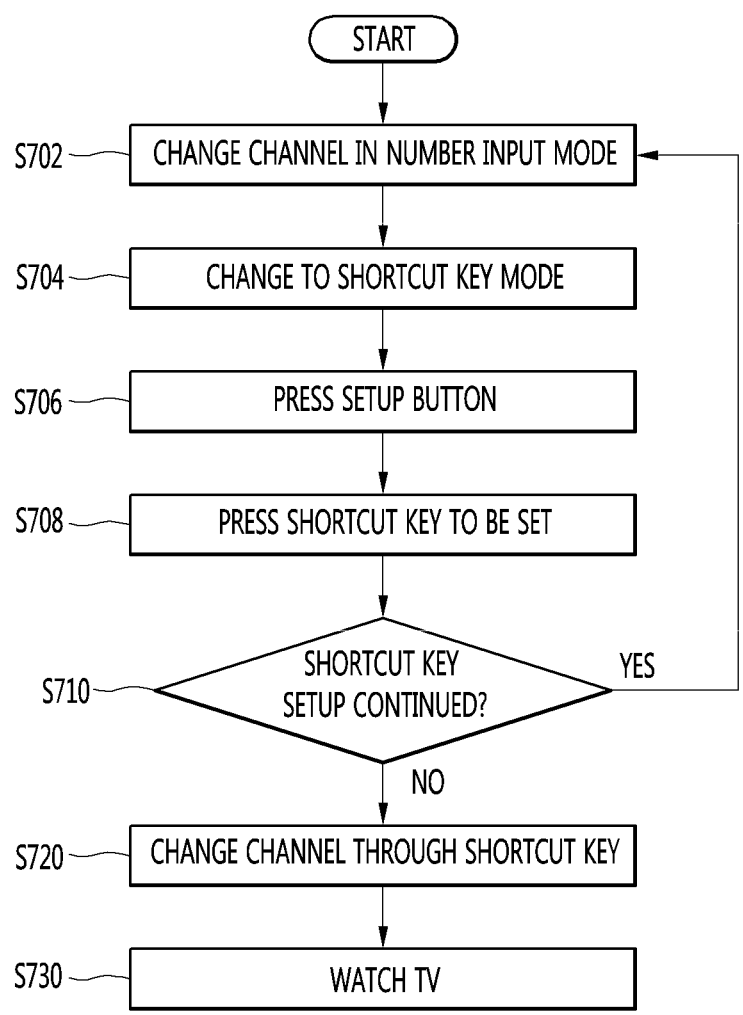
FIG. 9 is a flowchart illustrating a channel change method using a shortcut key in a remote control device.

Next, FIG. 9 is a flowchart of a channel change method using a shortcut key according to an embodiment of the present disclosure. In order to watch a broadcast program, a user turns on a display device and performs a channel change to a desired channel in operation S702. When the user opens the front cover 724 so as to set a shortcut key to the channel, a mode is automatically changed to a shortcut key mode by the mode change button 726 in operation S704.

When the mode is changed to the shortcut key mode in operation S704, the user presses a setup key disposed on the shortcut keypad 722 in operation S706 and presses a shortcut key marked with a specific name that the user wants to designate in operation S708. Thus, the shortcut key is set to the channel. If the user wants to continue to set a shortcut key in operation S710, the user repeats operations from S702 to S708. When the setting of the shortcut key is finished, the channel is changed by pressing the shortcut key to which the channel desired by the user is designated in operation S720. When the channel is changed through the shortcut key, the user watches the broadcast program of the corresponding channel in operation S730.

The channel change method using the shortcut key in accordance with the present disclosure includes: selecting a channel in a number input mode and changing a mode to a shortcut key mode by using the mode change button 726; setting a shortcut key, which is marked with a specific name desired by a user, to the channel in the shortcut key mode; and changing to a channel desired by the user by using the set shortcut key.

An example of the channel change through these processes will be described below. When the user wants to set a shortcut key KBS1 to channel number 7, the user changes a channel to channel number 7 in the number input mode and changes a mode to the shortcut key mode by opening the front cover 724 of the remote control device. After changing the mode to the shortcut key mode, the user can set the shortcut key KBS1 to the channel number 7 by pressing the setup button disposed on the shortcut keypad 722 and pressing the shortcut key KBS1 and can change the channel to the channel number 7 by pressing the shortcut key KBS1.

As another example, when the user wants to set a shortcut key User1 to channel number 34, the user changes a channel to channel number 7 in the number input mode and changes a mode to the shortcut key mode by opening the front cover 724 of the remote control device. After changing the mode to the shortcut key mode, the user can set the shortcut User1 to the channel number 34 by pressing the setup button disposed on the shortcut keypad 722 and pressing the shortcut key User1 and can change the channel to the channel number 34 by pressing the shortcut key User1.

Figure 10:
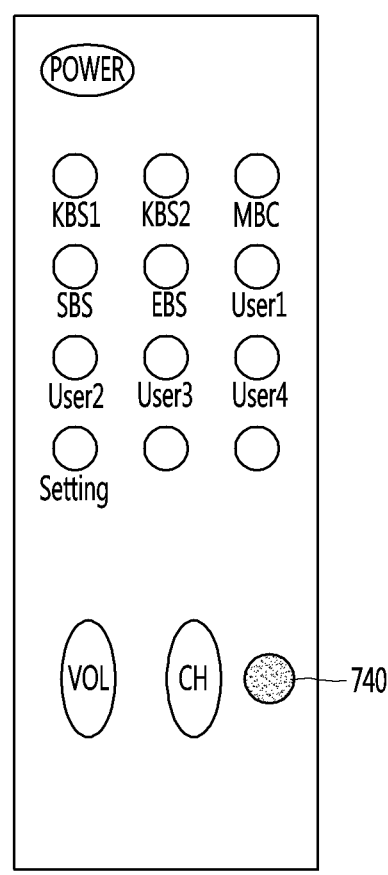
FIG. 10 is another view illustrating a channel change method using a shortcut key in a remote control device.

As shown in FIG. 10, the remote control device may further include a mode change button 740 capable of changing the mode to the shortcut key mode in a general remote control device. The mode change button 740 may be used to change the mode to the number input mode that receives an input of a numeric keypad in the remote control device and the shortcut key mode that receives an input of shortcut key functions under the numeric keypad. The shortcut key mode is performed when the mode change button 740 is turned on, and the number input mode is performed when the mode change button is turned off.

The process of setting the shortcut key by using the remote control device including the mode change button 740 having the above-described function and changing the channel by using the shortcut key will be described below. First, the user performs the channel change to the channel desired by the user in the number input mode. In order to set the shortcut key to the channel, the user changes the mode to the shortcut key mode by pressing the mode change button 740 disposed on the remote control device and presses the setup button under the numeric key (-). After pressing the setup button, the user sets the shortcut key to the desired channel by pressing the shortcut that the user wants to designate. If pressing the set shortcut key, it is possible to change to the desired channel without inputting the number or using the channel up/down key.

Figure 11:
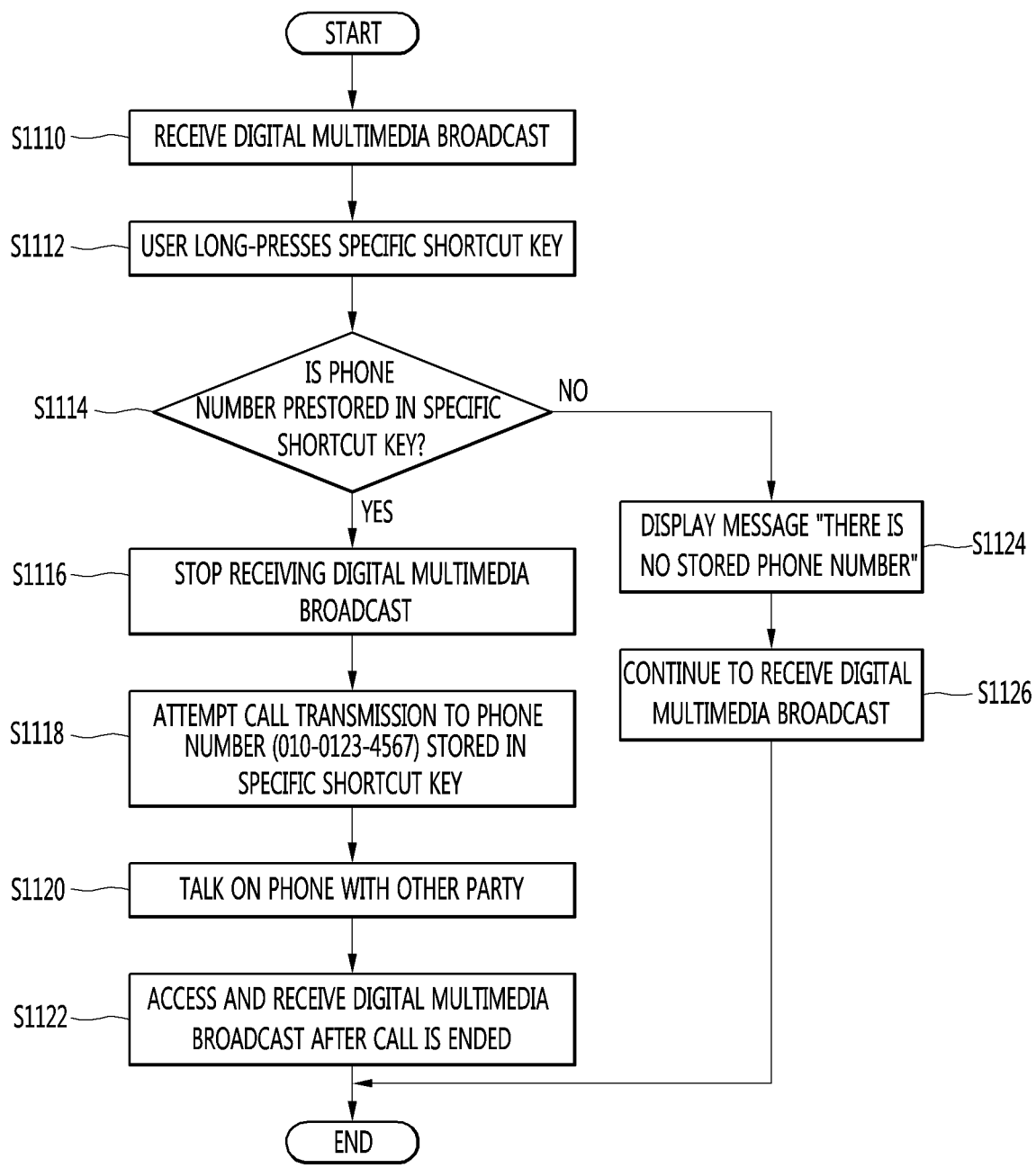
FIG. 11 is a flowchart of an example in which a display device progresses a call by using a shortcut key in accordance with the present disclosure.

Next, FIG. 11 is a flowchart of an example in which a display device progresses a call by using a shortcut key in accordance with the present disclosure. It is assumed that the user receives a digital multimedia broadcast through the display device and a phone number of the other party wanting a call transmission during reception of broadcast is 010-0123-4567. As shown in FIG. 11, while receiving the digital multimedia broadcast in operation S1110, the user presses a specific shortcut key for a predetermined time (2 to 3 seconds) when attempting call transmission in operation S1112.

Then, the display device searches for a phone number stored in a shortcut key in operation S1114. As the search result, if there is the phone number stored in the shortcut key, the display device stops receiving the digital multimedia broadcast in operation S1116 and attempts call transmission to the phone number (010-0123-4567) stored in the shortcut key in operation S1118.

Then, the user talks on the phone with the other party in operation S1120. After the call is ended, the display device accesses and receives the digital multimedia broadcast again in operation S1122. Further, when there is no previously input phone number in operation S1114, the display device displays a message "there is no stored phone number" in operation S1124 and continues to receive the digital multimedia broadcast in operation S1126. However, if the user short-presses a specific shortcut key during the reception of the digital multimedia broadcast, a digital multimedia broadcast channel may be changed.

Figure 12:
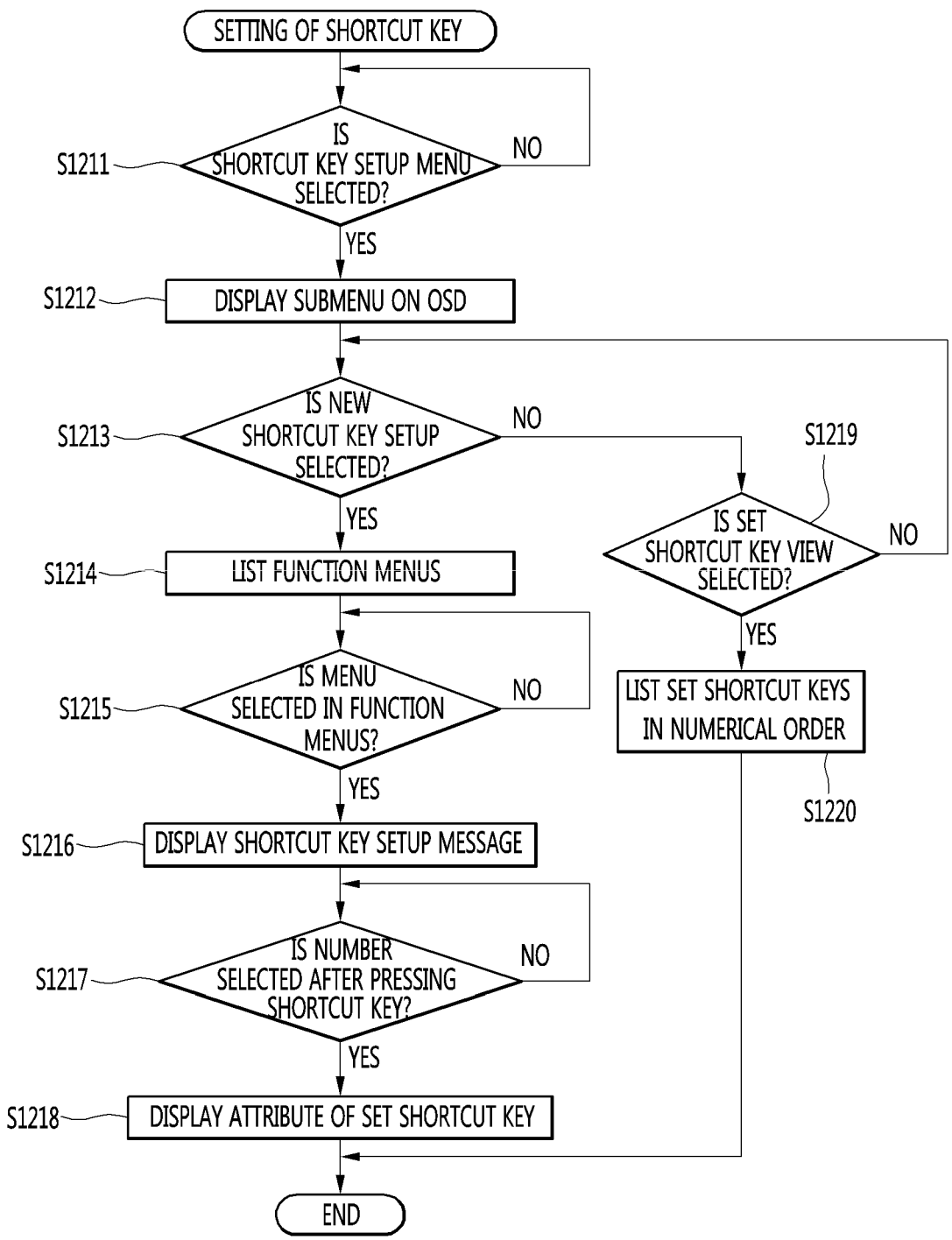
FIGS. 12 and 13 are flowcharts illustrating an example in which a display device sets and executes a shortcut key according to an embodiment of the present disclosure.

Next, FIGS. 12 to 15 are views illustrating an example in which a display device sets and executes a shortcut key according to an embodiment of the present disclosure. As shown in FIG. 12, the method of setting the shortcut key in the display device according to an embodiment of the present disclosure may include: first operations S1211 and S1212 of determining whether a user selects a shortcut key setup menu in a menu displayed on a screen and displaying a submenu on the screen when it is determined that the user selects the shortcut key setup menu; second operations S1213 and S1214 of determining whether the user selects a new shortcut key setup in the submenu and listing function menus when the user selects the new shortcut key setup; third operations S1215 and S1216 of determining whether the user selects a function in the function menus and displaying a message of instructing a user to input a shortcut key to be set to the function when one function is selected; operations S1217 and S1218 of determining whether the user presses a shortcut key and a number key, and setting a shortcut number to the selected function and outputting a confirmation message when it is determined that the user presses the shortcut key and the number key; and operations S1219 and S1220 of listing set shortcut keys on the screen in numerical order when the user selects a shortcut key view in the submenu.

The shortcut key setting procedure includes a total of five operations with respect to the comparison and determination processes. First operations S1211 and S1212 inform the user of the submenu present in the shortcut key setup menu and instruct the user to perform operations necessary for proceeding to next operation.

Second operations S1213 and S1214 determine which menu is selected from the submenu by the user and determine whether to enter different subroutines according to the selected submenu. Third operations S1215 and S1216 determine which subroutine the function menu corresponds to with respect to the function menu in the submenu selected by the user and which function menu is set with the shortcut key.

Fourth operations S1217 and S1218 determine which shortcut number is selected from shortcut numbers 0 to 9 with respect to the selected function menu and allow the user to confirm the selected shortcut number by displaying an attribute of the set shortcut key to the user. Fifth operations S1219 and S1220 are branched from second operation S1213 to perform operation of listing the shortcut keys set by the user in numerical order. Thus, the user can know the shortcut key set by the user and use this information to modify the list of the shortcut keys again.

Figure 13:
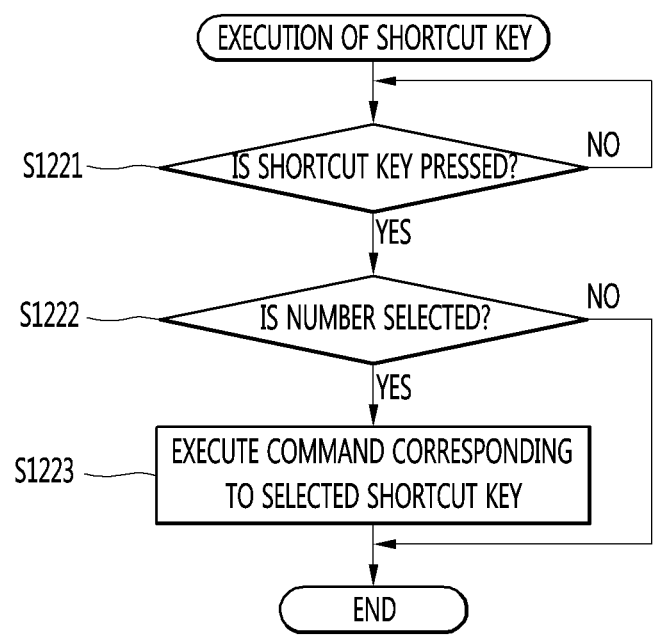

Also, as shown in FIG. 13, the method of executing the shortcut key in the display device according to an embodiment of the present disclosure may further include: sixth operations S1221 and S1222 of determining whether the user presses the shortcut key and the numeric key; and seventh operation S1223 of, when it is determined that the two keys are pressed, executing a command corresponding to the numeric key with reference to a shortcut menu set by the shortcut key setup. The shortcut key executing procedure includes a total of two steps, namely, comparison and determination operations and an execution operation.

Sixth operations S1221 and S1222, which are the comparison and determination operations, determine whether the user presses the shortcut key and presses the numeric key. Sixth operations S1221 and S1222 can determine whether to execute the shortcut command and distinguish from the channel selection operation.

Seventh operation S1223, which is the execution operation, executes the command corresponding to the shortcut key selected by the numeric key. Detailed procedures are performed to execute the command corresponding to the numeric key with reference to the shortcut key set by the shortcut key setting. For example, if a current time setting is set to a shortcut key "1", the current time setting is instantly executed when the user presses the shortcut key and the numeric key "1".

Figure 14:
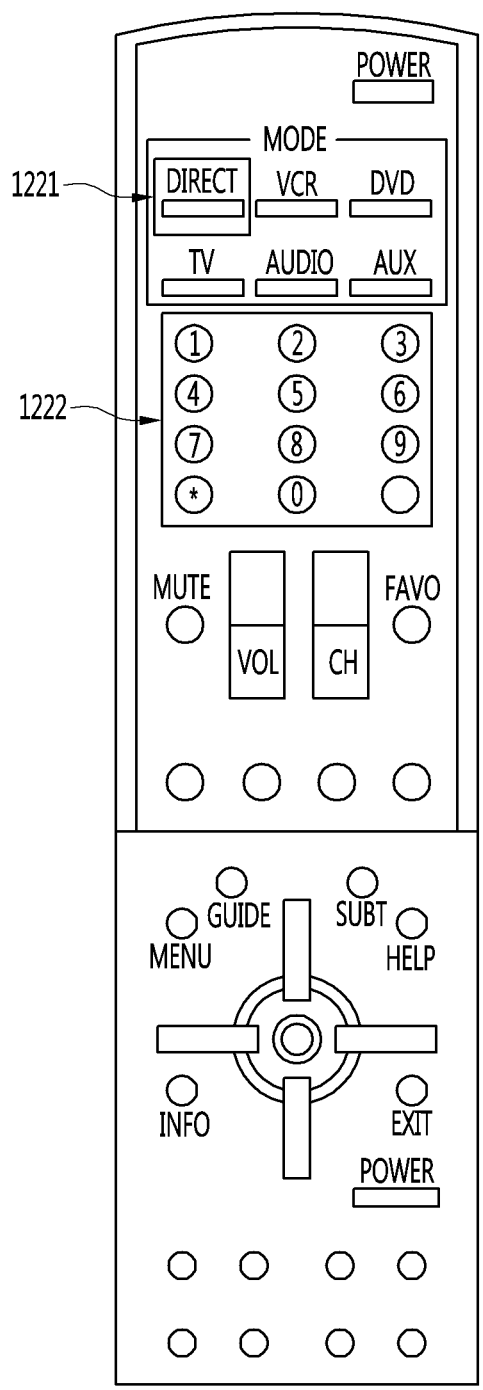
FIGS. 14 and 15 are views illustrating an example in which a display device sets and executes a shortcut key according to an embodiment of the present disclosure.
Figure 15:
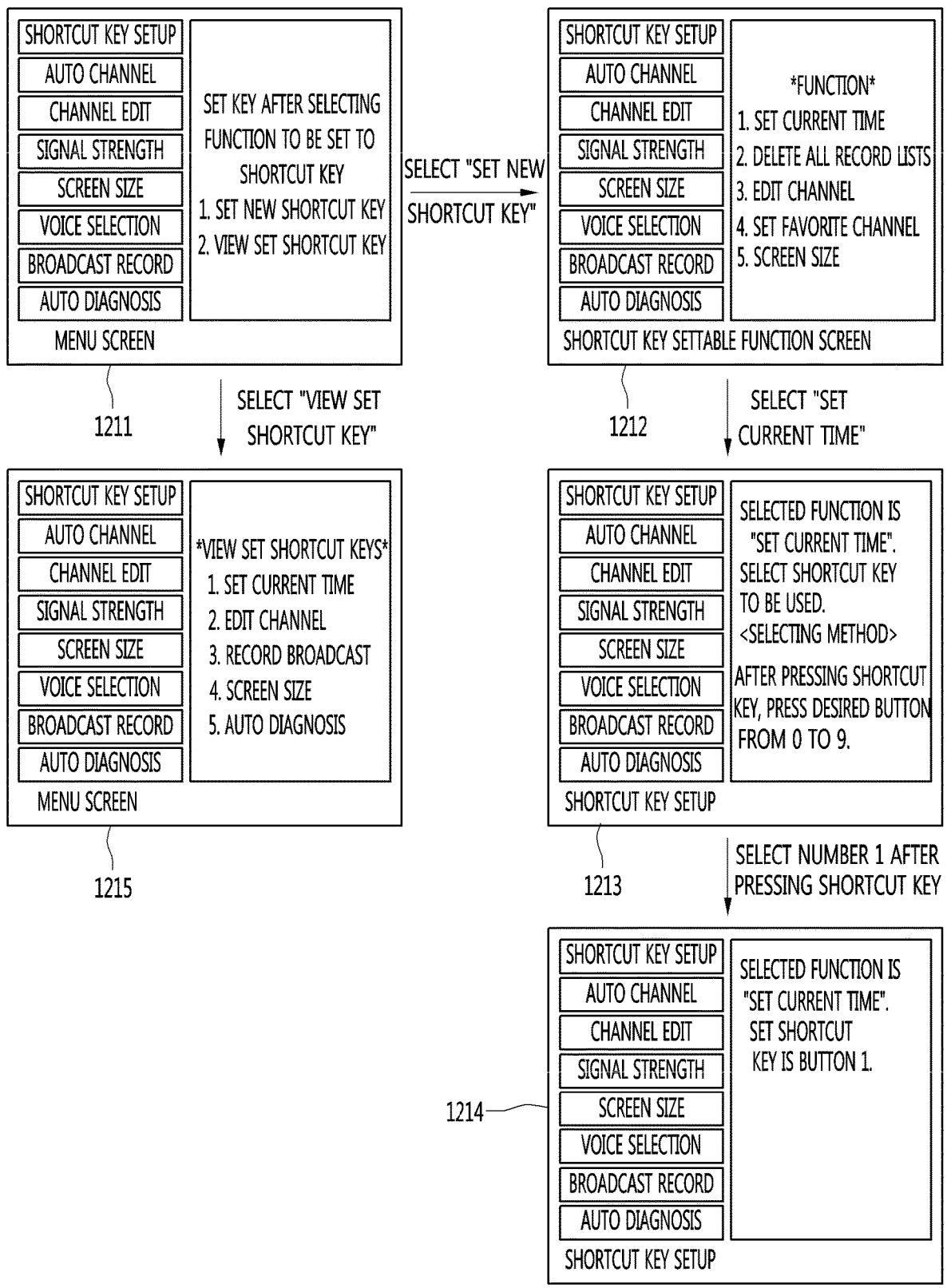

Hereinafter, operations of the present disclosure will be described with reference to the accompanying drawings. As shown in FIG. 14, the user manipulates the display device by pressing a button of a general remote controller. The shortcut key 1221 is allocated in a left upper portion that is a region where no function key is allocated, and the numeric key 1222 is located in a middle region.

It is assumed that the user presses a menu button, views a menu screen provided by the display device, selects a shortcut key setup menu, and sets a shortcut key to a frequently used function. The operation flow will be described with reference to an on-screen display (OSD) shown in FIG. 15.

When the user selects the shortcut key setup menu, the display device displays the operation instruction and the submenu for the shortcut key setup on a right side of a screen 1211. When the user selects a new shortcut key setup in the submenu, the display device lists functions settable by the shortcut keys on a screen 1212. When the user selects a function to be set to a shortcut key among the listed functions, the display device displays, on a screen 1213, a message confirming the function selected by the user and a message instructing the user to press a numeric key allocated to the selected function.

When the user presses the shortcut key and the desired numeric key, the display device outputs, on a screen 1214, the selected function and a message confirming the number of the shortcut key set to the selected function, so as to allow the user to confirm the procedures performed by the user. The user can confirm the function set to the shortcut key. When the user selects a shortcut key view set in the shortcut key setup menu, the display device lists the set shortcut keys on a screen 1215. Accordingly, the user can confirm the shortcut key set by the user.

Figure 16:
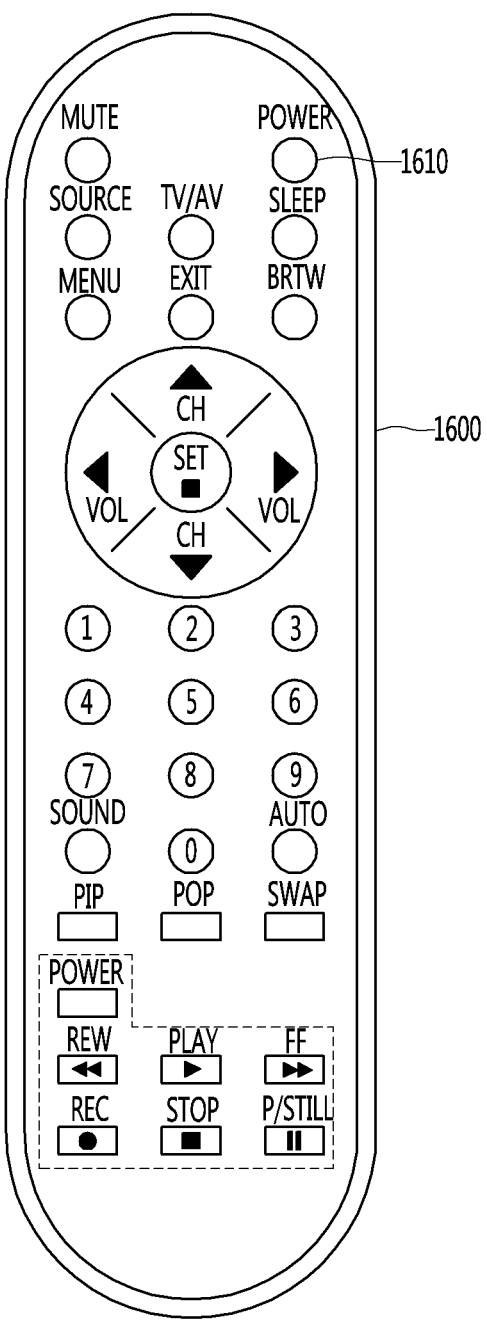
FIGS. 16 and 17 are views illustrating another example in which a display device sets and executes a shortcut key according to an embodiment of the present disclosure.
Figure 17:
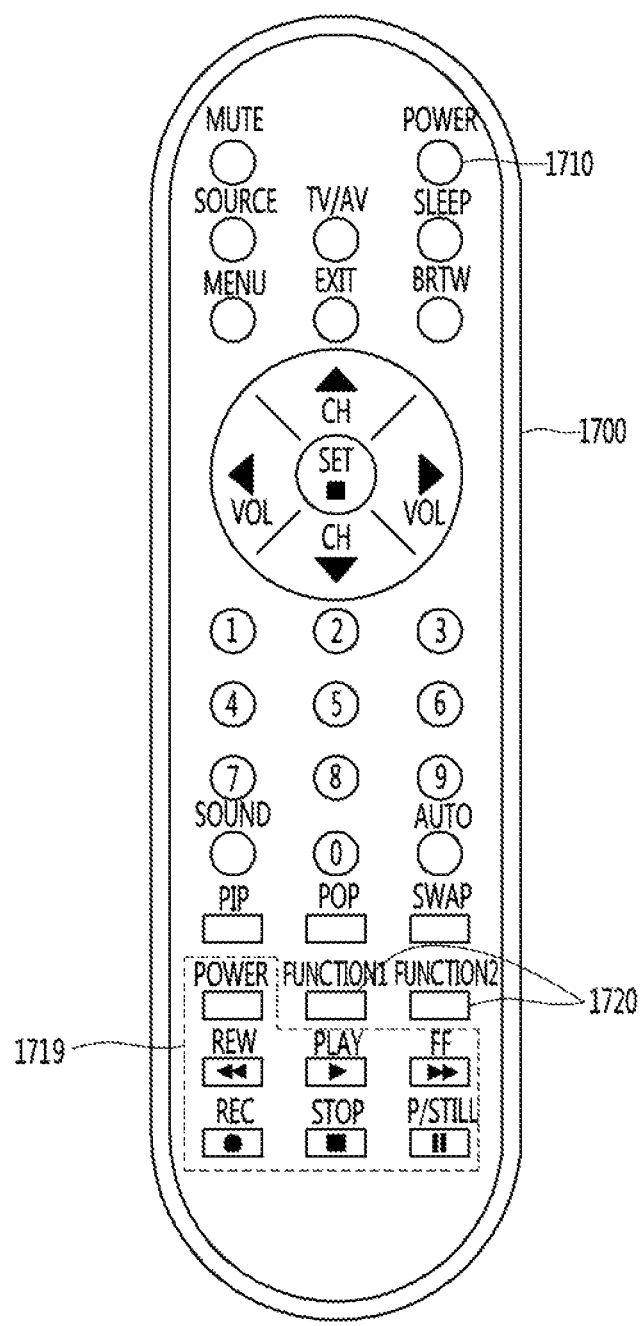
Figure 18:
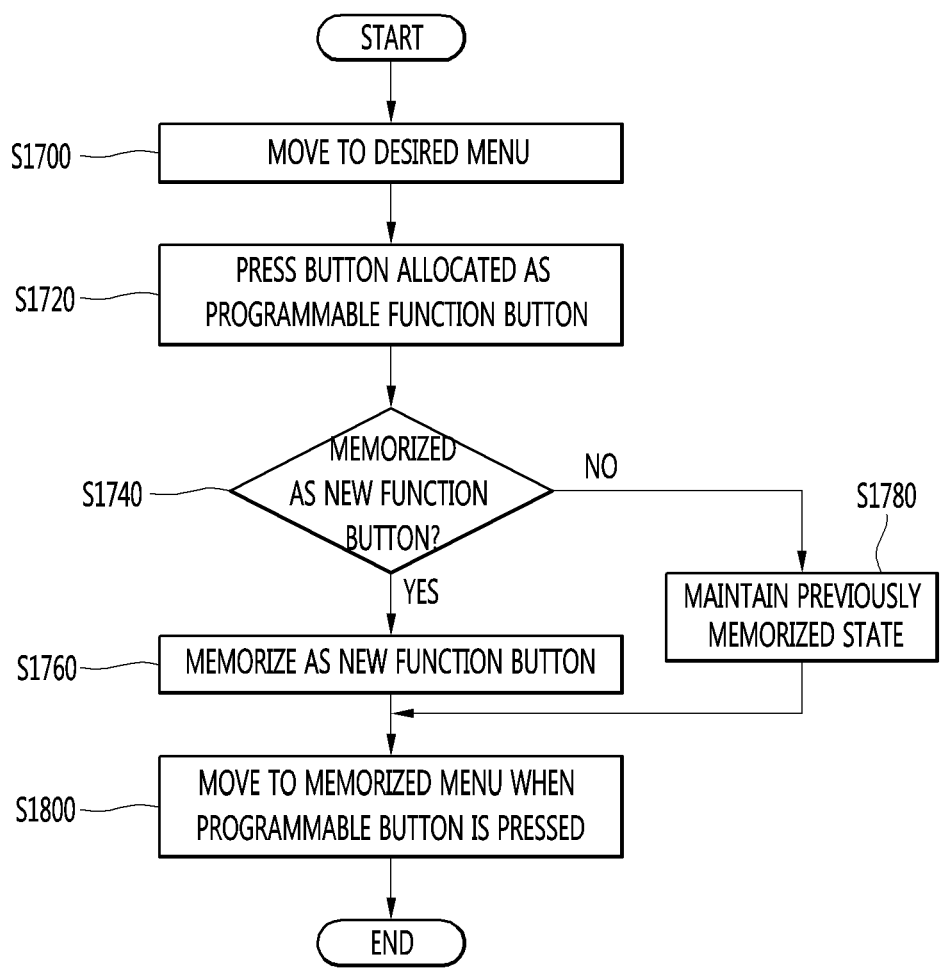
FIG. 18 is a flowchart illustrating another example in which a display device sets and executes a shortcut key according to an embodiment of the present disclosure.

FIGS. 16 to 18 are views illustrating another example in which a display device sets and executes a shortcut key according to an embodiment of the present disclosure. As shown in FIG. 16, a general remote control device 1600 includes a plurality of shortcut function keys 1610 or buttons implementing unique programmed functions (e.g., power key) with one-touch keys. The shortcut function keys or buttons include information containing unique data.

That is, when a predetermined shortcut function key or button provided in the remote control device 1600 is pressed, an embedded microcomputer or controller wirelessly transmits a code corresponding to the input shortcut function key or button over a wireless signal. A receiver of an electrical or electronic product reads coded data included in the input wireless signal and inputs the corresponding information to a microcomputer or controller of the electrical or electronic product.

In addition to the function of the key in the remote control device, a menu key capable of performing a more detailed control is provided. Thus, the user can press the menu key to perform control in more detail while viewing a menu OSDed on the display device. However, in order to select the function that the user desires, the menu-type key input operation must search for several tree-shaped hierarchical structures one by one. Thus, the key input procedure may be inconvenient for the user, and the absence of a simple method for a key input procedure with respect to a frequently selected function makes the user feel inconvenient whenever the user performs a key manipulation.

That is, a representative function operated by a general remote control device is exposed as shortcut function keys such as a channel change key, a volume control key, and a numeric key. In order to operate the other functions, the user must press the menu key and select a desired operation while viewing the OSDed menu. In this instance, even though the key frequently implemented by arbitrary users is present in a submenu of a menu program upon initial program, a menu function and a submenu search function must be repeated so as to operate the key.

In order to achieve such purposes, the remote control device with the programmable function keys, which has a menu key for OSDing a program prestored by the user, includes a plurality of shortcut function keys that perform operations preprogrammed for performing different various functions, and at least one programmable function key capable of registering at least one of menu functions OSDed by the menu key so as to operate with the shortcut function key according to the user's selection.

The method of registering the shortcut function key in the remote control device with the programmable function keys, which allows the user to register a shortcut function key that directly performs one of the menu keys, is as follows. A user selects a specific menu among the OSDed menus by using the menu key provided on the remote control device. When the user requests the registration as the shortcut function key by pressing the programmable function key, the display device registers the pressed programmable function key as a new shortcut function key.

When the user requests the registration as the new shortcut function key by pressing the programmable function key, the display device performs an operation of OSDing whether the programmable function key is memorized as a new function button, and an operation of registering the programmable function key as the shortcut function key when the user presses the programmable function key once within a set time.

Other objects, features, and advantages of the present disclosure will become apparent from the detailed description and drawings. Hereinafter, the remote control device having the programmable function keys and the method of registering the shortcut function key in accordance with the present disclosure will be described below with reference to the accompanying drawings.

FIG. 17 is a view illustrating the remote control device having the programmable function keys in accordance with the present disclosure. As shown in FIG. 17, the remote control device 1700 having the programmable function keys in accordance with the present disclosure includes: a plurality of shortcut function keys 1719 configured to perform preprogrammed operations for performing different various functions; and at least one programmable function key 1720 capable of registering an arbitrary menu function selected by the user as an arbitrary shortcut function key according to the user's selection from the menu functions OSDed by the menu key among the plurality of shortcut function keys 1710.

That is, the programmable function key 1720 does not perform any specific function at initial factory shipments, but the menu function OSDed after the menu key is pressed by the user is registered as a shortcut function key according to the user's selection. For example, when the user wants to register the OSDed menu as the shortcut function key, the user's selection is to press the programmable function key 1720 once or to press the programmable function key 1720 twice so as to prevent incorrect input of the user. Alternatively, an internal processor of the display device may check the frequently OSDed menu function and allows the user to select the registration of the corresponding menu function as the shortcut function key by displaying the OSD related to the registration.

FIG. 18 is a flowchart illustrating a method of registering a programmable function key as a shortcut function key in accordance with the present disclosure. In the method of registering the programmable function key as the shortcut function key in accordance with the present disclosure, while the remote control display device capable of OSD such as the display device is controlled by using the general shortcut function key 1710, the user selects a specific menu from the OSDed menu by using the menu key so as to perform the menu function that is not present in the shortcut function key 1710 of the remote control device 1700 in operation S1700.

When the user presses the programmable function key (button) in operation S1720, the display device displays the OSD indicating whether to memorize a new function button, that is, a new shortcut function key in operation S1740. If necessary, one-time pressing may register the new shortcut function key immediately according to a protocol with the display device.

If the user presses the programmable function key once again within a set time (for example, 2-3 seconds), the programmable function key is memorized as a new function button menu (shortcut function key) and the display device displays "Registered" on the OSD in operation S1760. However, if the user does not press the programmable function key within the set time or if a key input except for the programmable function key is received, it is not memorized as the new function button menu and a previously memorized state is maintained in operation S1780.

Then, if the user presses the programmable function key, the display device moves to a memorized menu when the programmable function key is memorized as the shortcut function, and executes the memorized function in operation S1800. If not registered, no operation is performed.

Figure 19:
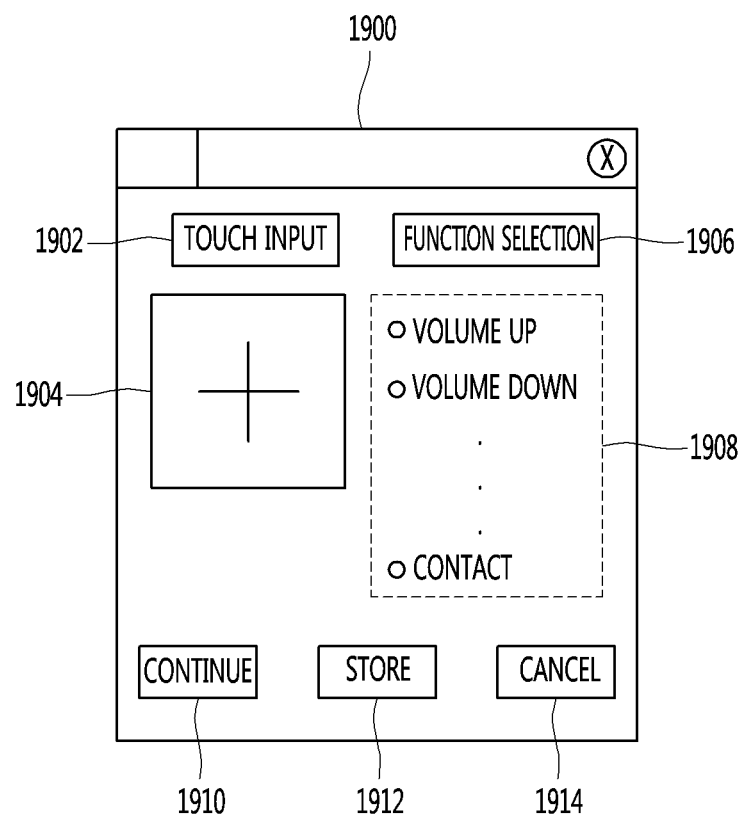
FIGS. 19 and 20 are views illustrating an example in which a display device maps a touch operation and a function according to an embodiment of the present disclosure.
Figure 20:
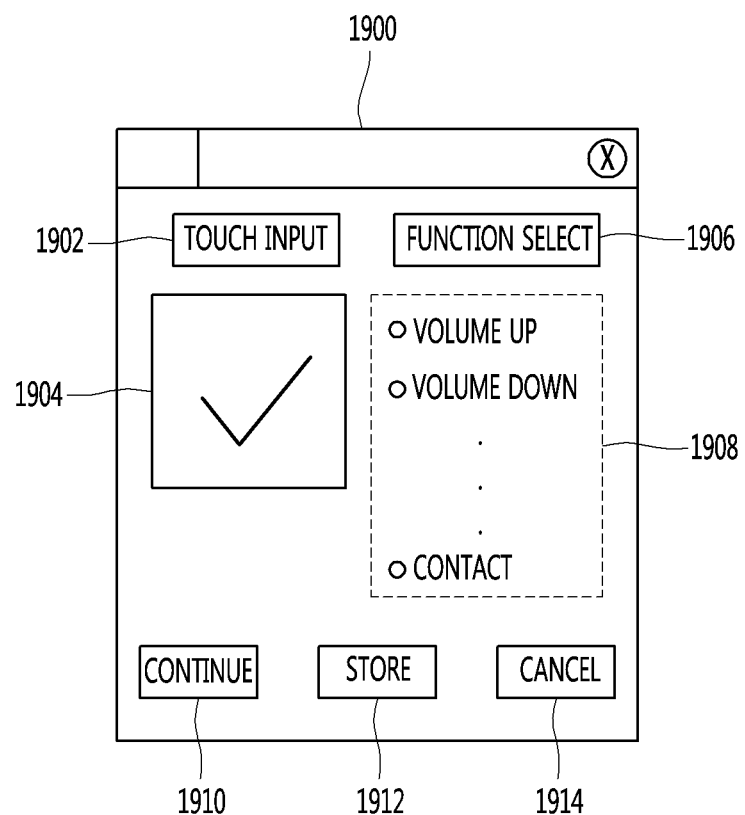
Figure 21:
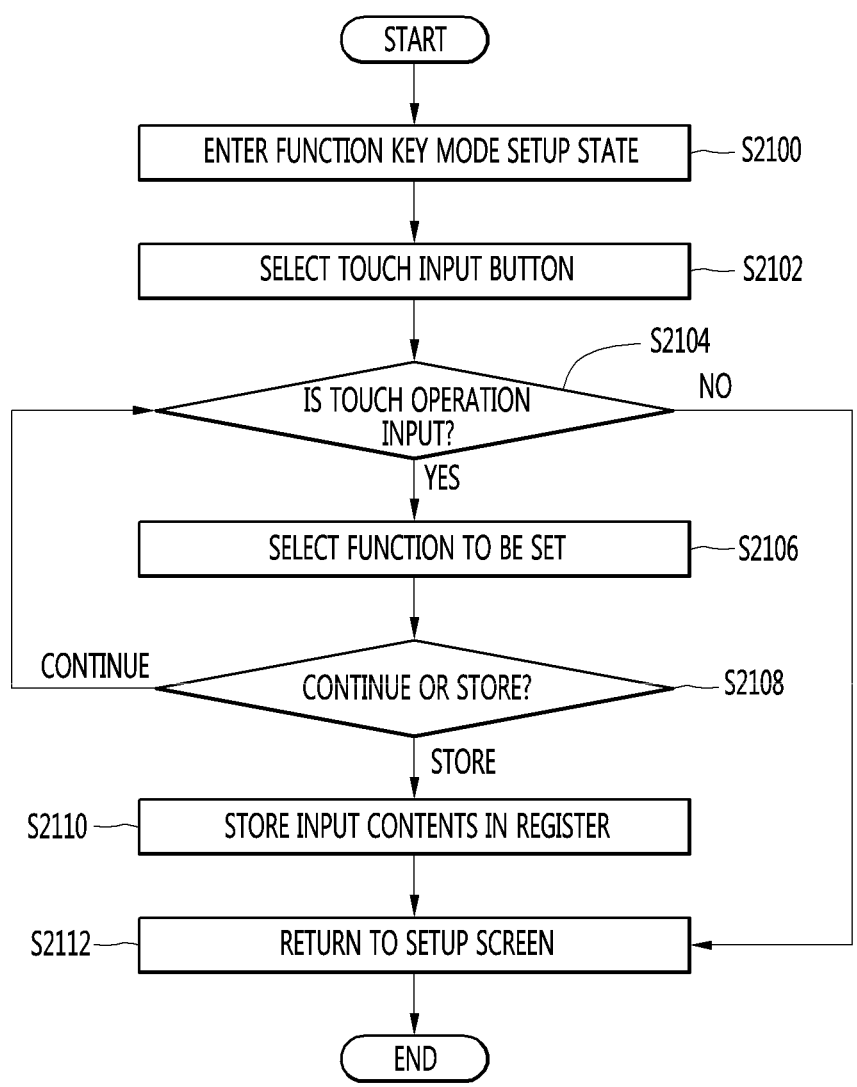
FIG. 21 is a flowchart illustrating an example in which a display device maps a touch operation and a function according to an embodiment of the present disclosure.

FIGS. 19 to 21 are views illustrating an example in which a display device maps a touch operation and a function according to an embodiment of the present disclosure. Referring to FIG. 19, a function key mode setup screen 1900 includes a touch input button 1902 that is an optional mode for allowing a user to input a touch operation, a touch input window 1904 allowing an input of a touch operation to be actually used, a function select button 1906 for selecting a function to be allocated to the touch operation, a function list 1908 indicating a list of functions to be allocated, a continue button 1910 for inputting a new touch operation after a function is allocated to one touch operation, a store button 1912 for, when the function is allocated to the touch operation, storing the allocated contents in a register, and a cancel button 1914 for cancelling the function allocation of the touch operation. When the display device enters the function key mode setup screen 1900, the user clicks the touch input button 1902 and inputs a desired touch operation on the touch input window 1904.

FIG. 20 illustrates a state in which the user inputs a touch operation for controlling a volume-up in a "V" shape. As shown in FIG. 20, when the touch operation is input and the function to be allocated is selected, the user clicks the store button 1912 so as to store the allocated function in the register. A list of functions allocated to newly defined touch operations is separately stored and managed. A user interface (UI) is configured so that the user can edit the touch operation for the desired function at any time and can easily confirm the touch operation to be allocated when the user does not memorize the touch operation to be allocated. The function select button 1906 and the function list 1908 are displayed in an inactive state in a touch input standby mode.

Referring to FIG. 21, in order to allocate the function key, the user uses the mode selection key to enter the function key mode setup state in operation S2100. In order to input the touch operation for the function key, the touch input button is selected in operation S2102. It is determined whether the touch operation is input on the touch input window in operation S2104.

When it is determined in operation S2104 that the touch operation is input, the function select button and the function list are activated and a desired function is selected in operation S2106. When the touch operation input and the function key selection are completed, it is whether to allocate a touch operation to a next function key, whether to input a touch operation again, or whether to store the currently input touch operation and the function allocation in operation S2108.

When it is determined in operation S2108 that the button is continuously selected, the currently set touch operation and the function list selection are unselected, a new touch operation is allowed to be input. or touch operations and functions other than the function for the previously allocated touch operation are allowed to be set.

When it is determined in operation S2108 that the store button is input, the input contents are stored in the register so that the execution of the function is controlled by the set touch operation in operation S2110. When the function key setup for the touch operation is completed, the display device returns to the setup screen in operation S2112. At the time of inputting the touch operation, the touch operation may be recognized by one-time touch input. the touch operation to be allocated may be recognized only when the same touch operation is input twice.

As described above, since one touch operation is input and applied to one function key and stored in the register, it is possible to overcome the limitations of similar functions and more facilitate the user's device manipulation by using the touch operation selected by the user to control the function key.

Figure 22:
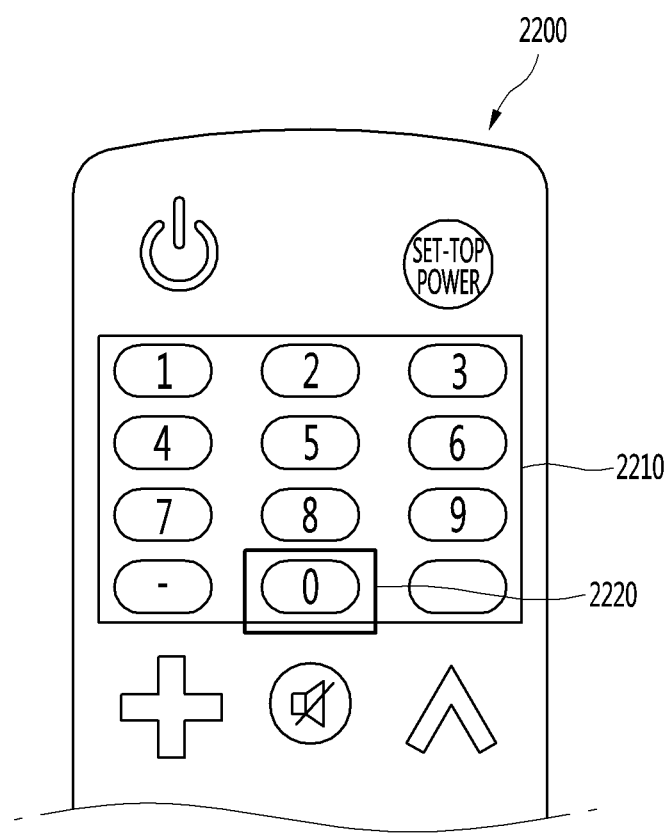
FIG. 22 is a view illustrating a location of a function key of a remote control device of a display device according to an embodiment of the present disclosure.

Next, FIG. 22 is a view illustrating a location of a function key of a remote control device of a display device according to an embodiment of the present disclosure. As shown in FIG. 22, a remote control device 2200 for controlling a display device according to an embodiment of the present disclosure may include a keypad unit 2210. A specific key included in the keypad unit 2210 may be used as a function key 2220. For example, it is assumed in FIG. 22 that a numeric key "0" is designated as the function key 2220, any keys included in the remote control device 2200 may be set as the function key.

The display device according to an embodiment of the present disclosure can map various functions to the function keys included in the remote control device 2200. The mapping process can be started by long-pressing the function key. This will be described in more detail with reference to FIGS. 23 to 28.

Figure 23:
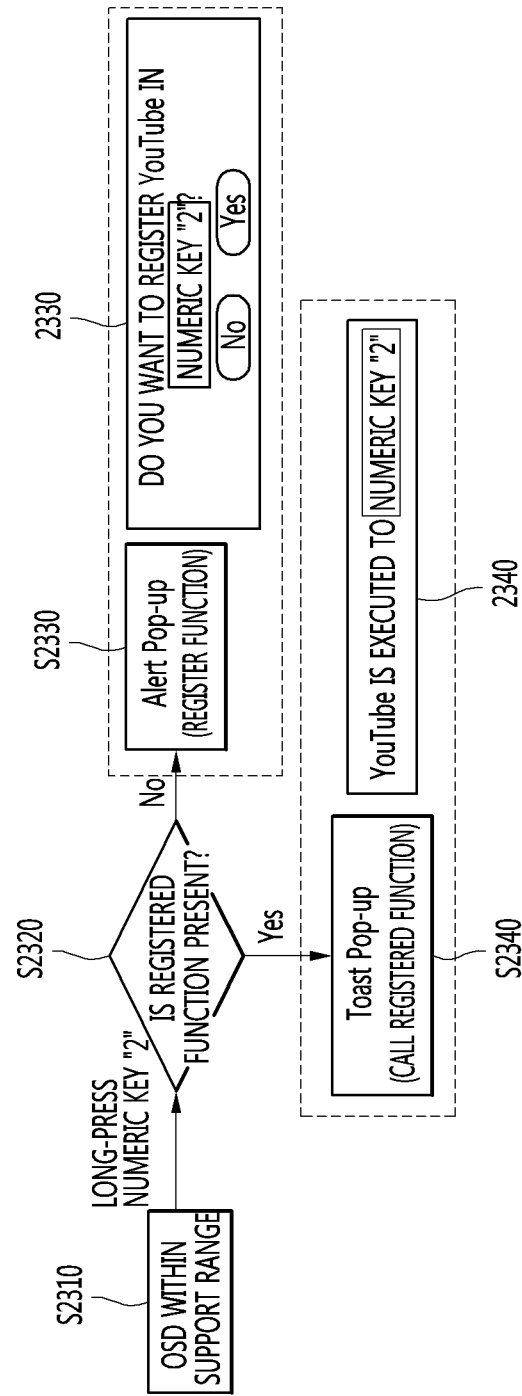
FIGS. 23 and 24 are flowcharts illustrating an example in which a display device maps at least one application to a function key of a remote control device according to an embodiment of the present disclosure.

FIGS. 23 to 26 are views illustrating an example in which a display device maps at least one application to a function key of a remote control device according to an embodiment of the present disclosure. As shown in FIG. 23, it is assumed that an OSD showing a range supporting the function key mapping function is displayed on the display device in operation S2310. The user of the display device may long-press a numeric key "2" in the remote control device connected to the display device.

The display device receiving the long-press input of the numeric key "2" may determine whether an application or channel mapped to the numeric key "2" is present in operation S2320. When it is determined that the mapped application or channel is not present, the display device may display, on a display unit, a window 2330 for receiving a selection about whether to map the application or channel to the numeric key "2" in operation S2330. Further, when it is determined that the mapped application or channel is present, the display device may display, on the display unit, a window 2340 including a message indicating that the application or channel mapped to the numeric key "2" is executed in operation S2340. The display device may remove the window 2340 and execute the application or channel mapped to the numeric key "2".

Figure 24:
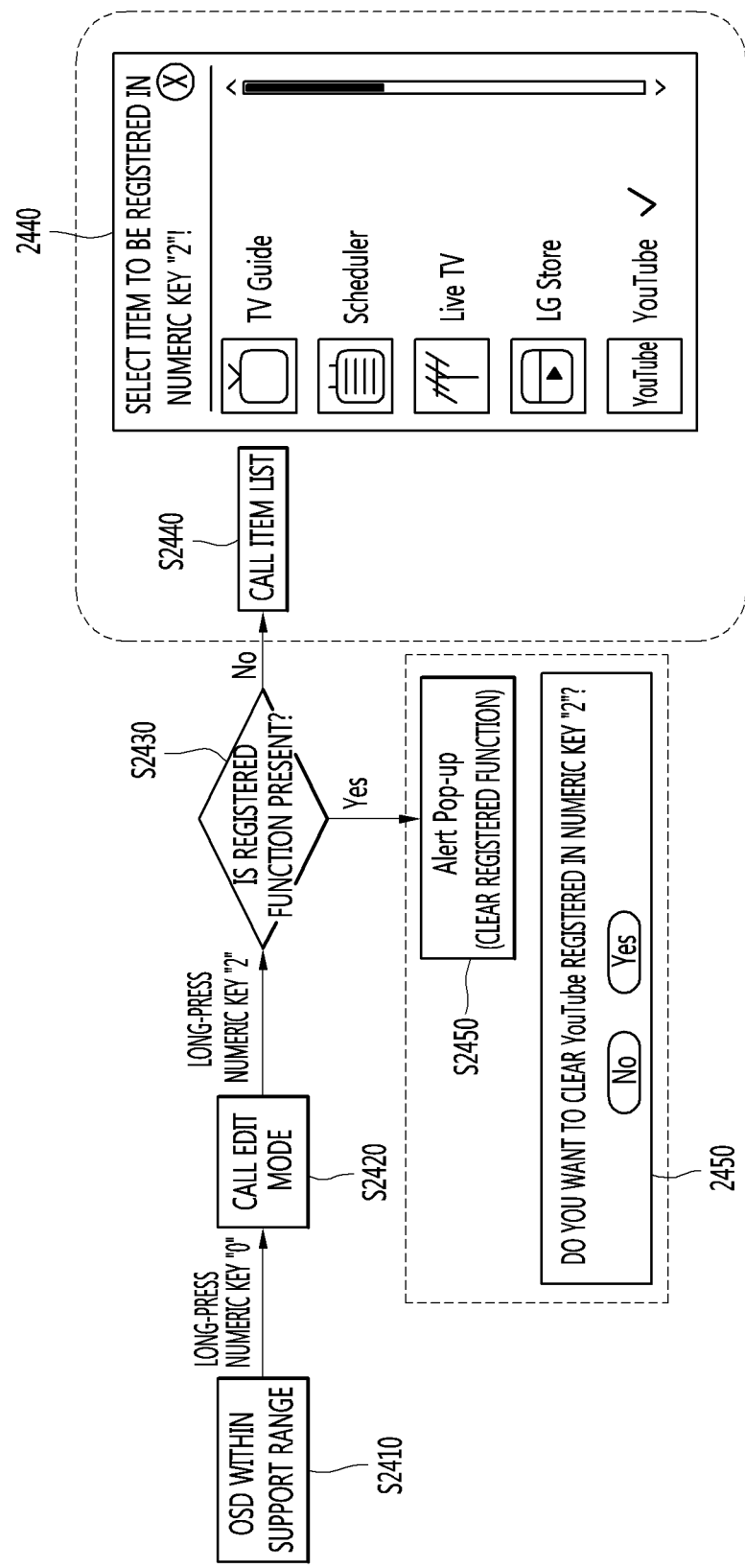

The display device according to an embodiment of the present disclosure may drive an edit mode by using the function key of the remote control device. For example, as shown in FIG. 24, it is assumed that an OSD showing a range supporting the function key mapping function is displayed on the display device in operation S2310. In this instance, the user can long-press the numeric key "0" of the remote control device. The display device receiving the long-press input of the numeric key "0" may drive the edit mode in operation S2420.

When the user long-presses the numeric key "2" of the remote control device during the execution of the edit mode, the display device may determine whether an application or channel mapped to the numeric key "2" is present in operation S2420. When it is determined that the application or channel registered in the numeric key "2" is not present, the display device may display, on the display unit, a list popup window 2440 for registering the application or channel to the numeric key "2" in operation S2440. The list popup window 2440 may include a channel list or an application supporting the mapping function.

Also, the list popup window 2440 may include an application used by the user a predetermined number of times for a preset time or a channel list viewed by the user. Also, when it is determined that the application or channel registered in the numeric key "2" is present, the display device may display, on the display unit, a window 2450 for receiving a selection about the removal of the application or channel mapped to the numeric key "2" in operation S2450.

Figure 25:
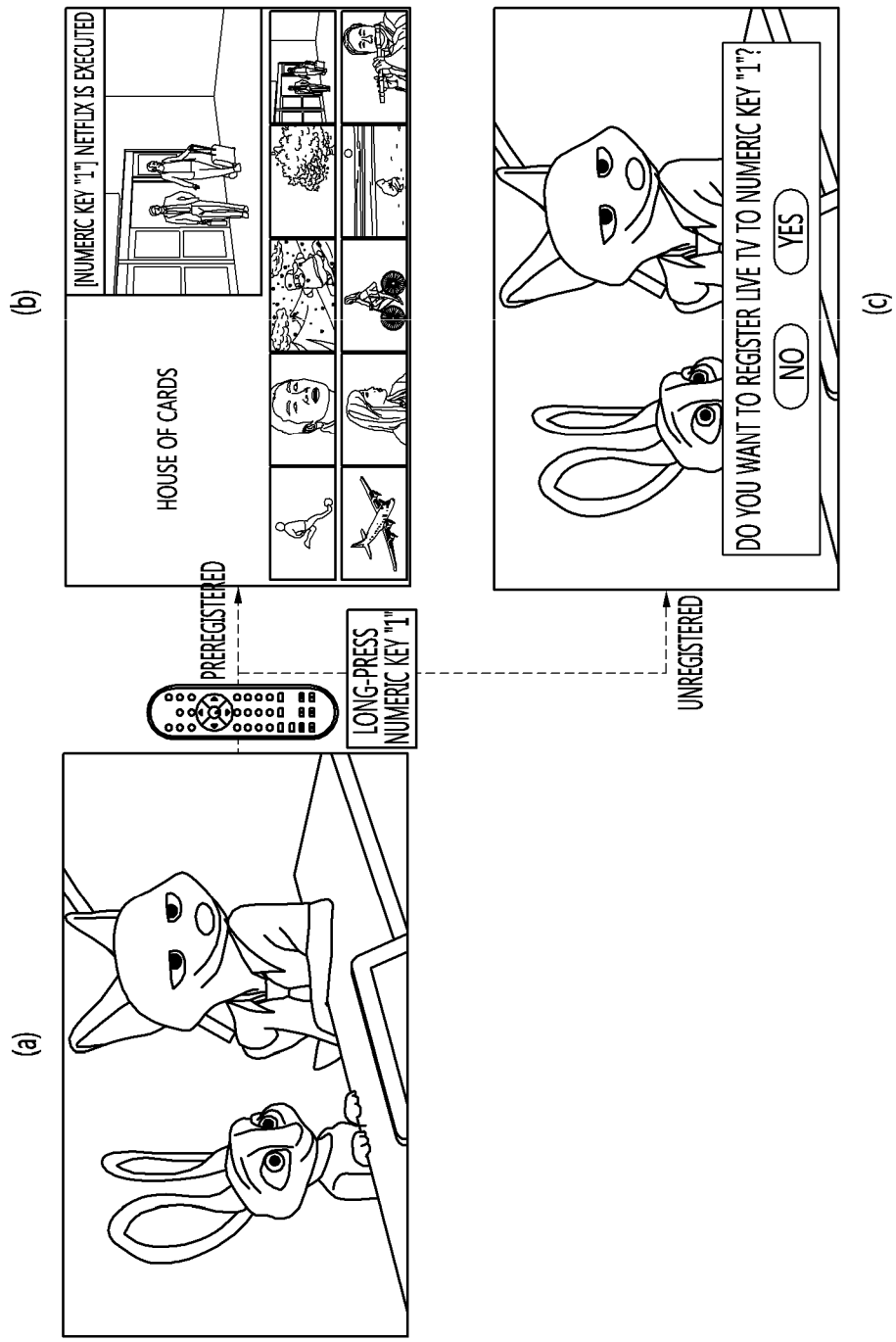
FIGS. 25 and 26 are views illustrating an example in which a display device maps at least one application to a function key of a remote control device according to an embodiment of the present disclosure.
Figure 26:
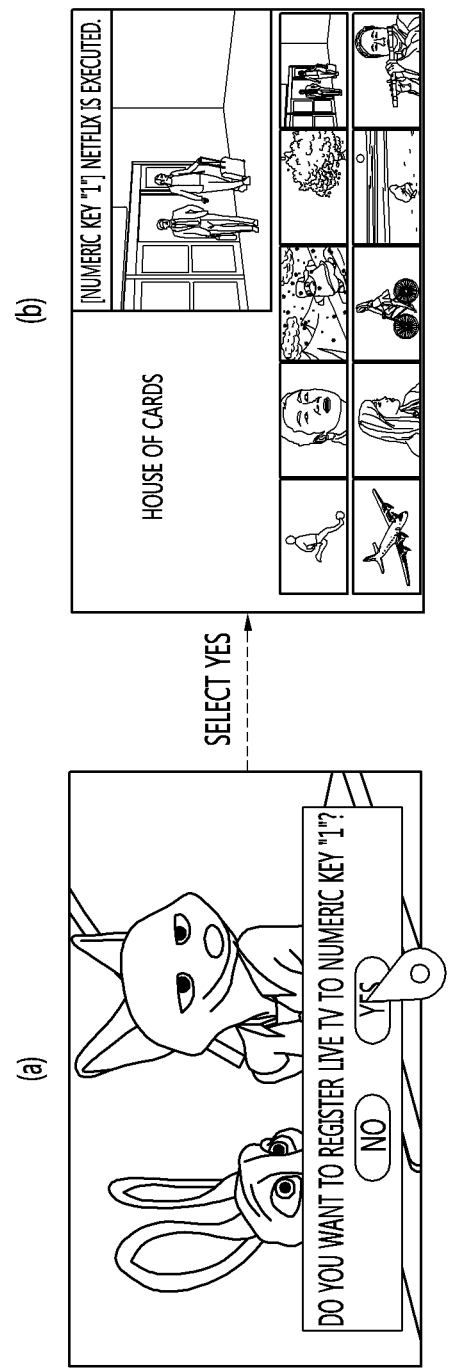

For example, as shown in FIG. 25(*a*), the function key mapping using the remote control device is possible only when the function key mapping function is supported on the display device. That is, when the execution of the function key mapping function is impossible, an additional function may not be executed even when the user long-presses a specific numeric key.

Then, the user can long-press the numeric key "1" of the remote control device connected to the display device. In this instance, as shown in FIG. 25(*b*), when the application mapped to the numeric key "1" is present, the display device executes the application mapped to the numeric key "1". In addition, a message window indicating that the application mapped to the numeric key "1" is executed may be displayed on an upper end of a screen.

Further, as shown in FIG. 25(*c*), when the application mapped to the numeric key "1" is not present, the display device may execute the process of mapping the application or channel to the numeric key "1". At this time, the display device can map the application being currently executed or the channel being currently received to the numeric key "1".

The user can map the application or channel to the numeric key "1" through a mapping registration window displayed on the display device.

That is, as shown in FIG. 26(a), the user can set the registration of the application to the numeric key "1" by using a pointer of the remote control device. As shown in FIG. 26(b), the display device may display, on the upper end of the screen, a message indicating that the application has been registered in the numeric key "1".

Figure 27:
FIGS. 27 to 31 are views illustrating an example in which a display device edits a function key mapping by using a function of a remote control device according to an embodiment of the present disclosure.

Next, FIGS. 27 to 31 are views illustrating an example in which a display device edits a function key mapping by using a function key of a remote control device according to an embodiment of the present disclosure. As shown in FIG. 27, the display device according to an embodiment of the present disclosure can display a function key edit window 2710 on a screen. For example, when the user long-presses a specific key of the remote control device, the display device can display the function key edit window 2710 on the screen. For example, the specific key may be a numeric key "0".

The function key edit window 2710 may include a list of function keys among a plurality of keys included in the remote control device. In FIG. 27, it is assumed that nine function keys of numbers "1" to "9" are displayed. The function key edit window 2710 may display an icon indicating whether an application or channel is mapped to each function key.

For example, as shown in FIG. 27, in the display device, the applications are mapped to the numeric keys "1", "2", and "3" of the remote control device, and the applications or channels are not mapped to the numeric keys "4", "5", "6", "7", "8", and "9". Currently mapped application icons 2711, 2712, and 2713 may be displayed at positions corresponding to the numbers "1", "2", and "3". Accordingly, the user can confirm the mapping between the function keys and the applications through the function key edit window 2710 at a glance. Also, the mapped function key information (for example, numbers "1", "2", and "3") may be displayed in the upper portions of the currently mapped application icons 2711, 2712, and 2713.

Figure 28:
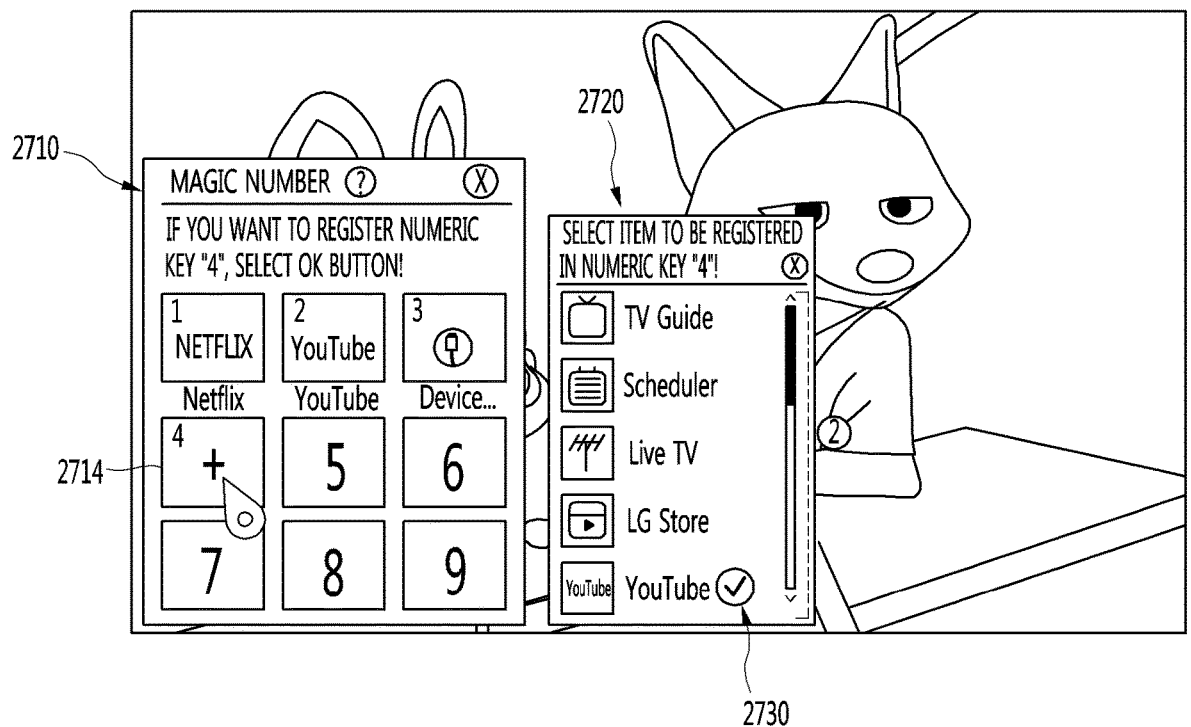

The user of the display device according to an embodiment of the present disclosure can select a specific function key on the function key edit window 2710 and map the application or channel. For example, as shown in FIG. 28, the user can select the number "4", to which an application or channel is not mapped, on the function key edit window 2710. In this instance, the display device can display, on the screen, the function key mapping window 2720 for mapping an application or channel is mapped to the number "4".

The function key mapping window 2720 may include a channel list or an application supporting the mapping function. Also, the function key mapping window 2720 may include an application used by the user a predetermined number of times for a preset time or a channel list viewed by the user. In addition, the function key mapping window 2720 may include a list of applications or channels that are not currently mapped but has been mapped once or more.

Further, the function key mapping window 2720 may include a list of channels or channels already mapped to other function keys. In this instance, the display device may display a mapping indictor 2730 with respect to the applications or channels mapped to other function keys in the function key mapping window 2720, so that the user can immediately recognize the mapped application or channels.

Figure 29:
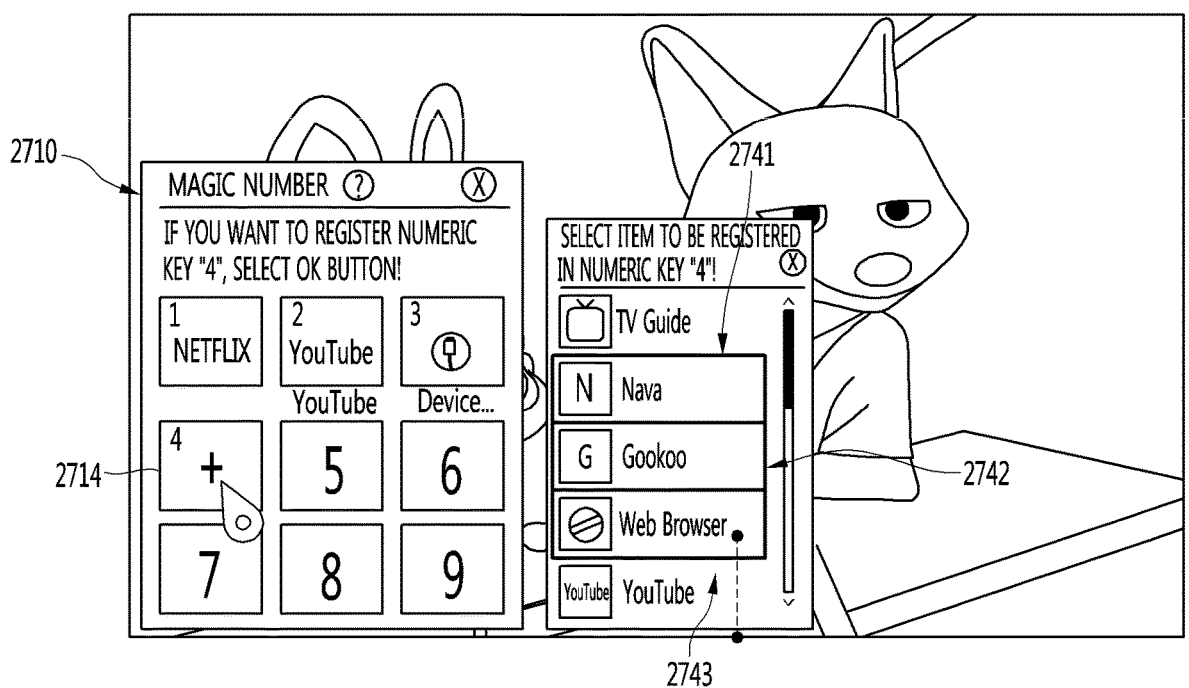

The user can map the corresponding application or channel to the function key by selecting the application icon or channel icon included in the function key mapping window 2720 or dragging and dropping the application icon or channel icon. The function key mapping window 2720 may include a web browser application. In this instance, the user can add a specific web address through a bookmark function. For example, as shown in FIG. 29, the user can add a first web address and a second web address to a bookmark list, and the function key mapping window 2720 may include a first bookmark web address icon 2741 corresponding to the first web address and a second bookmark web address icon 2742 corresponding to the second web address.

Also, the function key mapping window 2720 may include a general web browser icon 2743. Accordingly, the user can map the first bookmark web address icon 2741 corresponding to the first web address or the second bookmark web address icon 2742 corresponding to the second web address to the function key and can execute a web browser immediately connected to a specific web address by long-pressing the corresponding function key. Further, the general web browser icon 2743 can be mapped to the function key.

Figure 30:
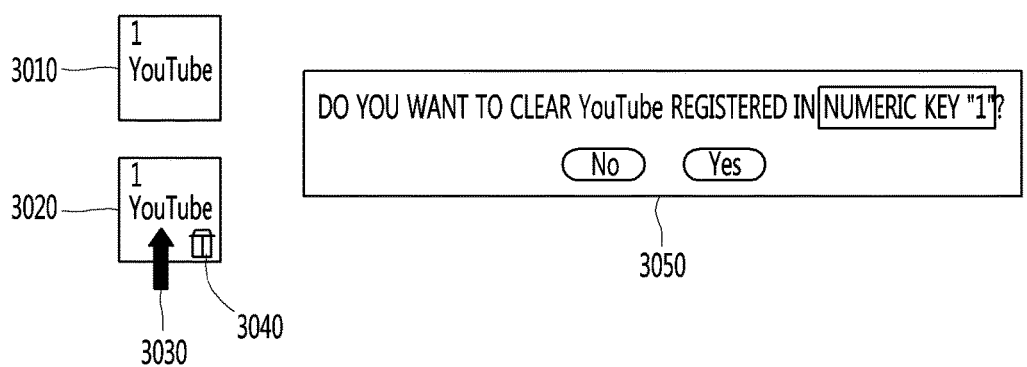

Also, the user can delete the application or channel mapped to the specific function key on the function key edit window 2710. For example, as shown in FIG. 30, it is assumed that a first application is mapped to a numeric key "1" on the function key edit window 2710. In this instance, a first application icon 3020 may be displayed at a position of the numeric key "1". When the user moves a pointer 3030 of the remote control device to the first application icon 3020, the first application icon 3020 may be displayed with a changed shade (3020), and a delete icon 3040 may be displayed in a lower end of the first application icon 3020 whose shade is changed. The user can select the delete icon 3040.

Figure 31:
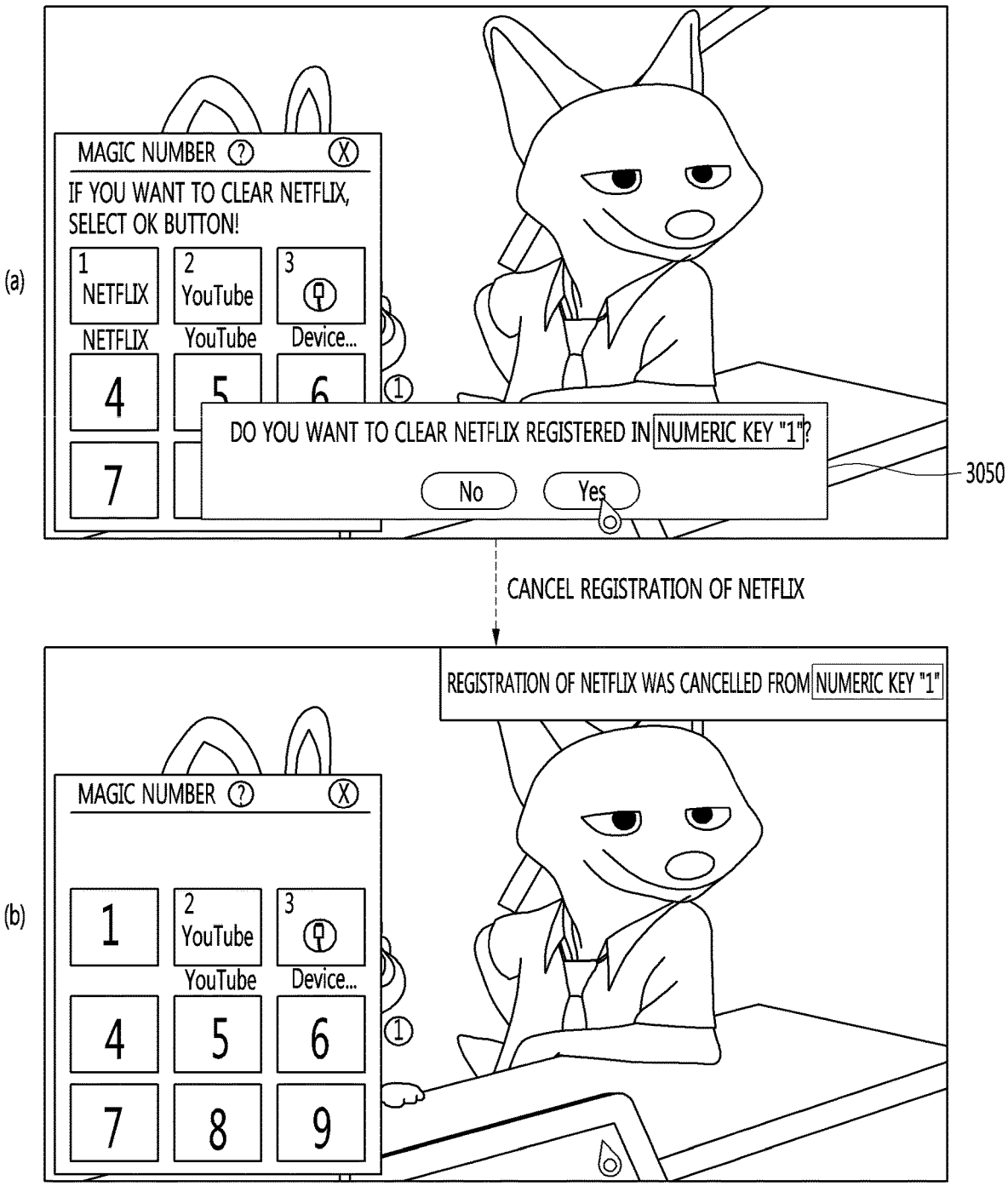

As shown in FIG. 31, the display device may display, on the screen, a window 3050 allowing a user to select whether to delete or clear the application mapped to the numeric key "1". The user can clear the mapping of the application mapped to the numeric key "1" on the window 3050. In this instance, the display device may display, on an upper end of the screen, a message indicating that the application has been unmapped from the numeric key "1", and may delete the application icon displayed at the position of the numeric key "1" on the function key edit window 2710.

The effects of the present disclosure are as follows. According to one or more embodiments of the present disclosure, it is possible to change to a shortcut key mode by using a mode change button, set a channel desired by a user by using a shortcut key, and change a channel by using the shortcut key, thereby achieving rapid and easy channel change.

According to one or more embodiments, a button is not further added for a new function. Thus, in developing and mass-producing a next version of a product to which a new function is added, an existing remote control device is used as it is, thereby reducing development costs of a remote control device. According to one or more embodiments, a remote control device having a programmable function key and a function key programming method thereof allow a user to register his or her favorite a favorite menu to a shortcut function key, thereby improving user convenience.

According to an embodiment, the above-described method may also be embodied as processor-readable codes on a program-recorded medium. According to an embodiment, the above-described method may be embodied as processor-readable codes in a medium on which a program is recorded. Examples of processor-readable mediums include ROM, RAM, CD-ROM, a magnetic tape, a floppy disk, an optical data storage device, and the like. If desired, the processor-readable medium may be realized in the form of a carrier wave (for example, a transmission over the Internet).

The aforementioned display devices are not applied such that the configurations and methods according to the embodiments are limited, but all or part of the embodiments may be selectively combined and configured to achieve various modifications.

What is claimed is:

1. A display device comprising:
a display;
a user input interface configured to receive a signal from a remote control device; and
a controller configured to:
when a function key setup mode entry signal is received from the remote control device, display a plurality of keys of the remote control device in a first window on the display, the plurality of keys respectively including images of numeric keys for inputting a desired number,
display a mapped application icon on the image of a first key to which a first application is mapped among the plurality of keys,
in response to a first input on the image of a second key to which an application is not mapped, display a function key mapping window on the display for mapping a second application to the second key while the first window is being displayed,
wherein the function key mapping window includes a list of applications that can be mapped to the plurality of keys of the first window, and
wherein the controller is configured to:
display an indicator with respect to a third application mapped to a third key among the applications in the list of applications of the function key mapping window to indicate that the third application is mapped to the third key,
wherein, when a pointer of the remote control device is located on the image of the second key, display an application mapping indicator on the second key, and
wherein, when the application mapping indicator is selected, display the function key mapping window including the list of applications on the display.

2. The display device of claim 1, wherein the controller is further configured to receive a second input on the image of the second key, and change to a channel corresponding to the desired number in response to the second input.

3. The display device of claim 1, wherein the list of applications includes applications installed on the display device sorted in descending order of use frequency during a set period.

4. The display device of claim 1, wherein the function key setup mode entry signal is an input of a specific key included in the remote control device.

5. The display device of claim 1, wherein, in response to a second input on the image of the second key, the controller is further configured to map an application being currently executed to the second key.

6. The display device of claim 1, wherein the first application includes a web address of a specific webpage.

7. The display device of claim 1, wherein the controller is further configured to:
display a delete icon on the image of the first key, and
delete the mapping of the first application to the first key in response to a selection of the delete icon.

8. A method of controlling a display device, the method comprising:
receiving, via a user input interface, a signal from a remote control device;
when a function key setup mode entry signal is received from the remote control device, displaying a plurality of keys of the remote control device in a first window on a display of the display device, the plurality of keys respectively including images of numeric keys for inputting a desired number;
displaying a mapped application icon on the image of a first key to which a first application is mapped among the plurality of keys; and
in response to a first input on the image of a second key to which an application is not mapped, displaying, via the display, a function key mapping window for mapping a second application to the second key while the first window is being displayed, wherein the function key mapping window includes a list of applications that can be mapped to the plurality of keys of the first window,
wherein the method further comprises:
displaying an indicator with respect to a third application mapped to a third key among the application in the list of applications of the function key mapping window to indicate that the third application is mapped to the third key,
when a pointer of the remote control device is located on the image of the second key, displaying an application mapping indicator on the second key, and
when the application mapping indicator is selected, displaying the function key mapping window including the list of applications on the display.

9. The method of claim 8, further comprising:
receiving a second input on the image of the second key; and
changing to a channel corresponding to the desired number in response to the second input.

10. The method of claim 8, wherein the list of applications includes applications installed on the display device sorted in descending order of use frequency during a set period.

11. The method of claim 8, wherein the function key setup mode entry signal is an input of a specific key included in the remote control device.

12. The method of claim 8, further comprising:
in response to a second input on the image of the second key, mapping an application being currently executed to the second key.

13. The method of claim 8, wherein the first application includes a web address of a specific webpage.

14. The method of claim 8, further comprising:
displaying a delete icon on the image of the first key; and
deleting the mapping of the application to the first key in response to a selection of the delete icon.

* * * * *